US012450032B2

(12) United States Patent
Parker

(10) Patent No.: US 12,450,032 B2
(45) Date of Patent: Oct. 21, 2025

(54) ENTROPY SOURCE AND CHARGE PUMP OF A RANDOM NUMBER GENERATOR

(71) Applicant: Intel Corporation, Santa Clara, CA (US)

(72) Inventor: Rachael Parker, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 642 days.

(21) Appl. No.: 17/687,250

(22) Filed: Mar. 4, 2022

(65) Prior Publication Data

US 2023/0280979 A1 Sep. 7, 2023

(51) Int. Cl.
 *G06F 7/58* (2006.01)
 *H10D 84/85* (2025.01)
(52) U.S. Cl.
 CPC ............ *G06F 7/588* (2013.01); *H10D 84/85* (2025.01)
(58) Field of Classification Search
 CPC ................................. G06F 7/588; H10D 84/85
 See application file for complete search history.

(56) References Cited

U.S. PATENT DOCUMENTS

| 10,168,994 B2 | 1/2019 | Parker et al. |
| 10,606,560 B1 * | 3/2020 | Pletcher ................. G06F 7/588 |
| 2009/0243792 A1 * | 10/2009 | Chmelar ................ G06F 7/588 340/5.6 |
| 2019/0339941 A1 * | 11/2019 | Wang ..................... G06F 7/588 |

OTHER PUBLICATIONS

R.J. Parker, Entropy Justification for Metastability Based Nondeterministic Random Bit Generator, IEEE 2017 (Year: 2017).*

* cited by examiner

*Primary Examiner* — Emily E Larocque
(74) *Attorney, Agent, or Firm* — Essential Patents Group, LLP

(57) ABSTRACT

Techniques and mechanisms for facilitating random number generation with an entropy source. In an embodiment, the entropy source comprises two complementary metal-oxide-semiconductor (CMOS) inverters which are cross-coupled with each other between a first node and a second node. A third CMOS inverter of the entropy source includes an output terminal coupled to the first node, and an input terminal which is to receive an adjustment voltage that is based on a first signal at the first node. The first, second and third CMOS inverters are each coupled to a third node by which each is to draw power. The entropy source is to update the first signal based on the adjustment voltage. In another embodiment, the entropy source is coupled to a switched capacitor circuit which is to generate the adjustment voltage based on a feedback of the first signal.

20 Claims, 9 Drawing Sheets

ENTROPY SOURCE AND CHARGE PUMP OF A RANDOM NUMBER GENERATOR

BACKGROUND

1. Technical Field

This disclosure generally relates to the technical field of electronic circuits and more particularly, but not exclusively, to an entropy source to facilitate random number generation

2. Background Art

Many electronic circuits, such as computer chips, use a random generator to generate random numbers for various functions, such as encryption and/or authentication. Some random number generators use an entropy source based on a metastable element to generate a random output value. The metastable element often operates based on feedback from deterministic and stochastic feedback mechanisms. In one such circuit, the deterministic feedback functions as a relaxation oscillator (e.g., an astable multivibrator), wherein the stochastic feedback provides a dynamic offset cancellation functionality.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
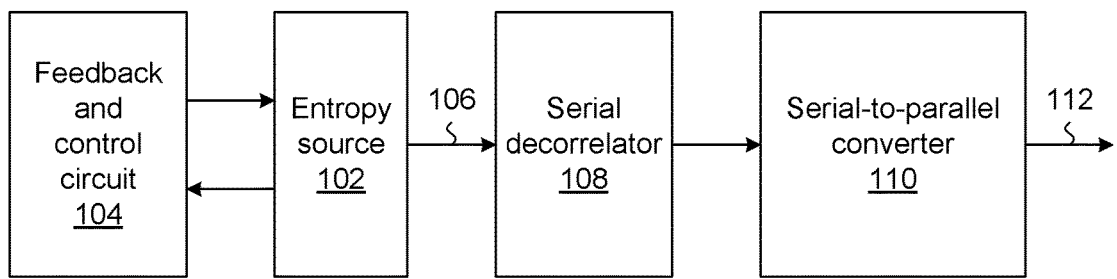
FIG. 1 shows a functional block diagram illustrating features of a random number generator circuit according to an embodiment.

Embodiments discussed herein variously provide techniques and mechanisms for a circuit to facilitate operations with an entropy source which supports random number generation. The technologies described herein may be implemented in one or more electronic devices. Non-limiting examples of electronic devices that may utilize the technologies described herein comprise any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices comprising circuitry which facilitates operation as a metastable element.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" comprise plural references. The meaning of "in" comprises "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Here, multiple non-silicon semiconductor material layers may be stacked—e.g., within a single fin structure. The multiple non-silicon semiconductor material layers may comprise one or more "P-type" layers that are suitable (e.g., offer higher hole mobility than silicon) for P-type transistors. The multiple non-silicon semiconductor material layers may further comprise one or more one or more "N-type" layers that are suitable (e.g., offer higher electron mobility than silicon) for N-type transistors. The multiple non-silicon semiconductor material layers may further comprise one or more intervening layers separating the N-type from the P-type layers. The intervening layers may be at least partially sacrificial, for example to allow one or more of a gate, source, or drain to wrap completely around a channel region of one or more of the N-type and P-type transistors. The multiple non-silicon semiconductor material layers may be fabricated, at least in part, with self-aligned techniques such that a stacked CMOS device may comprise both a high-mobility N-type and P-type transistor with a footprint of a single transistor.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

For purposes of the embodiments, the transistors in various circuits, modules, and logic blocks are Tunneling FETs (TFETs). Some transistors of various embodiments may comprise metal oxide semiconductor (MOS) transistors, which comprise drain, source, gate, and bulk terminals. The transistors may also comprise Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

Various random number generator (RNG) circuit designs are very sensitive to process, voltage and/or temperature (PVT) variation. Such sensitivity contributes to the need for additional test time during manufacturing, as well as to yield loss, and to security risks if parts with insufficient entropy are made available to bad actors. Some embodiments variously mitigate the sensitivity of RNGs to PVT variation, by providing a type of entropy source (ES) which exhibits improved randomness and dynamic range characteristics. Additionally or alternatively, some embodiments provide a switched-capacitor type of "stepper circuit" which, for example, facilitates improved performance of a random number generator when a common mode voltage is substantially equal to one half of a supply voltage (e.g., to Vcc/2).

Embodiments comprise apparatuses, methods, and systems associated with a random number generator that comprises an entropy source. To illustrate certain features of various embodiments, some entropy sources are variously described herein each with reference to their operation while coupled to a deterministic feedback circuit and a stochastic feedback circuit. For example, the deterministic feedback circuit comprises detection logic to detect when a bit of the output signal of the entropy source has registered, a pre-delay feedback path to cause the entropy source to power off responsive to the detection, and a post-delay feedback path to cause the entropy source to power on, after the entropy source is powered off, to generate a subsequent bit of the output signal. In one such embodiment, the post-delay feedback path comprises one or more delay cells that, for example, are able to be bypassed by the pre-delay feedback path.

In various embodiments, the detection logic outputs a pre-delay feedback signal based on the detection of when a bit of the output signal of the entropy source has registered. For example, the pre-delay feedback signal changes logical value when the logical values of the output signal and another "output bar" signal are different. The deterministic feedback circuit further comprises reset logic to receive both the pre-delay feedback signal, via the pre-delay feedback path, and a post-delay feedback signal via the post-delay feedback path, wherein the reset logic is coupled to the entropy source to power off and power on the entropy source based on the pre-delay signal and the post-delay signal. Additionally, or alternatively, the deterministic feedback circuit further comprises a first set-reset (SR) latch having a first input to receive the output signal from the entropy source, a second input to receive the post-delay feedback signal, and an output coupled to a first input of the detection logic, and a second SR latch having a first input to receive the output bar signal from the entropy source, a second input to receive the post-delay feedback signal, and an output coupled to a second input of the detection logic.

The pre-delay feedback path of the deterministic feedback circuit causes the entropy source to be powered on for less than half of a cycle of the deterministic feedback loop (e.g., for less than 45% of the cycle, such as less than 25% of the cycle). Additionally, the length of time that the entropy source is powered on is independent of the frequency at which the deterministic feedback loop operates (e.g., based on the length of the cycle). Since the entropy source consumes direct current (DC) current while it is powered on, these improvements save significant electrical power.

In various embodiments, the stochastic feedback circuit comprises a one shot circuit to generate one or more pulse signals based on a value of the output signal of the entropy source (e.g., the first bit). The stochastic feedback circuit further comprises a stepper circuit to control one or more stochastic feedback signals (e.g., the adjustment voltage, Vadj, signal described below) provided to the entropy source based on the one or more pulse signals (e.g., using a charge pump). The stochastic feedback signal controls a drive strength of a pair of contentious components (e.g., inverters) of the entropy source. A step size of a change in the drive strength of the pair of contentious components is based on the pulse width of the pulse signal. In some embodiments, the pulse width of the pulse signal is adjustable. For example, an adjustable tap is coupled to the delay line of the deterministic feedback circuit to control the pulse width of the pulse signal.

In some embodiments, the random number generator circuit comprises a serial decorrelator circuit to receive and process the output signal from the entropy source. The serial decorrelator circuit is operable to XOR individual bits of the output signal of the entropy source with a respective prior bit of the output signal that is a first number of bits prior to the individual bit to obtain XORed bits; subsample the XORed bits; and output the subsampled XORed bits to generate a random number. In some embodiments, the subsampled XORed bits are further processed by a serial-to-parallel converter to generate the random number.

FIG. 1 illustrates a random number generator circuit 100 (hereinafter "circuit 100") in accordance with various embodiments. The circuit 100 comprises an entropy source 102 and a feedback and control circuit 104 that form a feedback loop. The feedback and control circuit 104 provides stochastic feedback and deterministic feedback to the entropy source 102, as further discussed herein. The entropy source 102 generates an output signal at output terminal 106. In some embodiments, the circuit 100 further comprises a serial decorrelator 108 and/or a serial-to-parallel converter 110 to process the output signal of the entropy source 102 to provide an output signal of the circuit 100 (e.g., at output terminal 112). In some embodiments, the serial decorrelator 108 and/or serial-to-parallel converter 110 are not included in the circuit 100.

Figure 2:
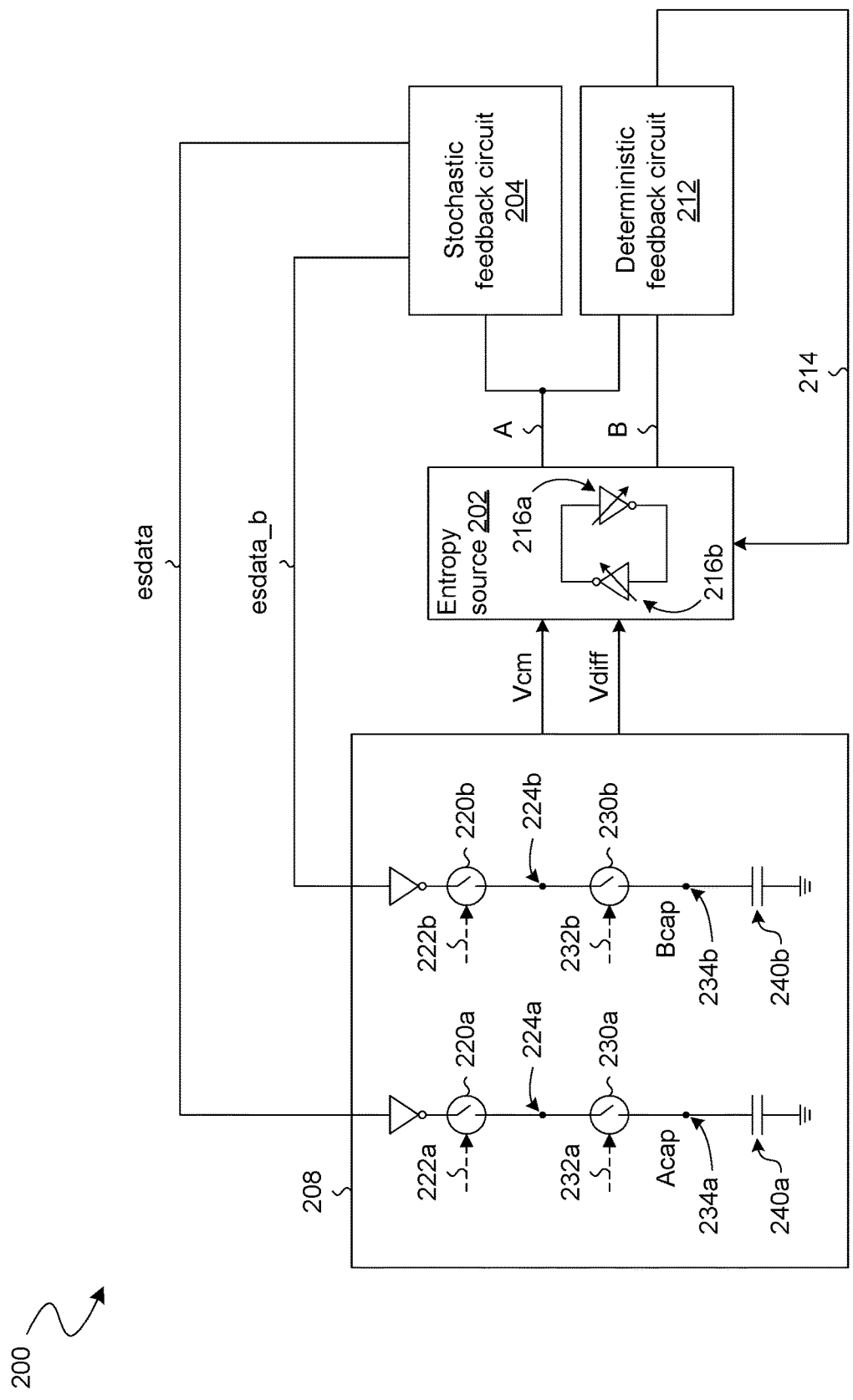
FIG. 2 shows a hybrid block-circuit diagram illustrating features of a circuit to provide feedback in a random number generator according to an embodiment.

FIG. 2 illustrates a circuit 200 comprising an entropy source 202. In one embodiment, the entropy source 202 corresponds to the entropy source 102 of circuit 100. The circuit 200 further comprises a stochastic feedback circuit 204 and/or a charge pump 208 (e.g., comprising switched capacitor circuits) on a stochastic feedback loop for the entropy source 202. Additionally, the circuit 200 comprises a deterministic feedback circuit 212 coupled to provide a deterministic feedback loop 214 for the entropy source 202. In one such embodiment, the stochastic feedback circuit 204, charge pump 208, and/or deterministic feedback circuit 212 are included (for example) with feedback and control circuit 104 of circuit 100. In an alternative embodiment, the charge pump 208 is part of stochastic feedback circuit 204.

In various embodiments, the entropy source 202 generates an output signal esdata and an output bar signal esdata_b. When the entropy source 202 is powered on and the output signal esdata registers, the output bar signal esdata_b represents a logical state which is the opposite of another logical state which is represented by the output signal esdata (e.g., esdata_b is logic 1 when esdata is logic 0 and esdata_b is logic 0 when esdata is logic 1). The output signals esdata and esdata_b are variously asserted when there is sufficient difference (e.g., greater than a transistor threshold voltage) between the outputs of the two inverters 216a-b. In the illustrative embodiment shown, entropy source 202 is represented as cross-coupled inverters 216a-b.

In the illustrative embodiment shown, charge pump 208 comprises two or more switched capacitor circuits, each comprising a respective capacitor and a respective in-series arrangement of switch circuits which, for example, are variously operated to selectively control a charging and/or discharging of said capacitor. By way of illustration and not limitation, a first switched capacitor circuit of charge pump 208 comprises a capacitor 240a and an in-series arrangement of switch circuits 220a, 230a. For example, switch circuits 220a, 230a are coupled to each other via a node 224a, wherein switch circuit 230a and capacitor 240a are coupled to each other via another node 234a. Responsive to respective control signals 222a, 232a, switch circuits 220a, 230a operate to charge (or discharge) capacitor 240a, at least in part, based on output signal esdata. With such selective charging and/or discharging of capacitor 240a, charge pump 208 is able to provide a voltage Acap at node 234a.

Similarly, a second switched capacitor circuit of charge pump 208 comprises a capacitor 240b and an in-series arrangement of switch circuits 220b, 230b. Switch circuits 220b, 230b are coupled to each other via a node 224b, wherein switch circuit 230b and capacitor 240b are coupled to each other via another node 234b. Responsive to respective control signals 222b, 232b, switch circuits 220b, 230b operate to charge (or discharge) capacitor 240b, at least in part, based on output signal esdata_b. With such selective charging and/or discharging of capacitor 240b, charge pump 208 is able to provide a voltage Bcap at node 234b.

In various embodiments, a given switched capacitor circuit of charge pump 208 comprises an in-series arrangement of two switch circuits which are directly coupled to one another. In one such embodiment, any capacitor component of circuit 200 is only indirectly coupled electrically (if at all) to a node which is between these two switch circuits—e.g., wherein any such capacitor component is coupled to the node only via respective circuitry comprising a respective one of the two switch circuits. For example, the only circuit components which are coupled at the node are the two switch circuits, in some embodiments.

As further described herein, various embodiments provide charge pump functionality which exploits a parasitic capacitance at the node between the two switch circuits. By way of illustration and not limitation, some embodiments omit a capacitor between node 224a and one of a supply voltage or a reference potential (e.g., a ground voltage), but instead rely on a parasitic capacitance between node 224a and the one of the supply voltage or the reference potential. Additionally or alternatively, some embodiments omit a capacitor between node 224b and one of the supply voltage or the reference potential, but instead rely on a parasitic capacitance between node 224b and the one of the supply voltage or the reference potential.

Based on output signals esdata and esdata_b, charge pump 208 provides to entropy source 202 both of the respective voltages Acap, Bcap at nodes 234a, 234b, which are characterized by a common mode voltage Vcm, and a differential voltage Vdiff between the respective voltages Acap, Bcap at nodes 234a, 234b. The voltages Vcm, Vdiff are adjusted over time based on a feedback which is provided with stochastic feedback circuit 204. In a typical random number generation use case, a goal of such adjustment is to have an output of an entropy source (for example, output signal esdata) indicate logic state 0 fifty percent of the time, on average, and to indicate logic state 1 during the other fifty percent of the time.

Figure 3A:
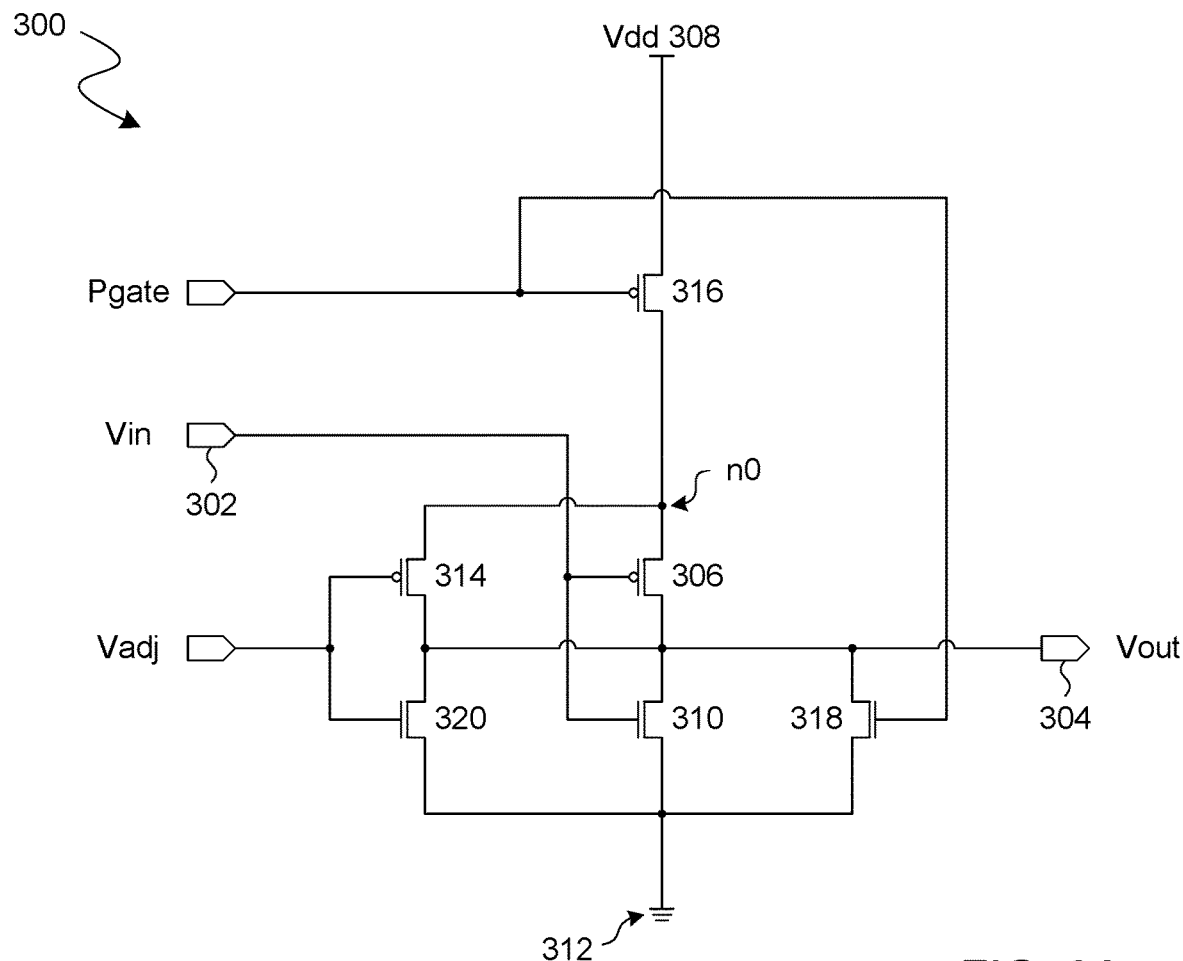
FIG. 3A shows a circuit diagram illustrating features of inverter circuitry to facilitate operation of an entropy source according to an embodiment.

The drive strength of the inverters 216a, 216b are adjustable based on the stochastic feedback. For example, FIG. 3A illustrates inverter circuitry 300 includes a circuit that provides functionality of one of inverters 216a, 216b, in some embodiments. Inverter circuitry 300 receives an input signal at an input terminal 302 and provide an output signal at an output signal 304. The output signal is an inverted version of the input signal. The inverter circuitry 300 comprises a p-type transistor 306 (e.g., p-type metal-oxide-semiconductor (PMOS) transistor) coupled between the output terminal 304 and a supply terminal 308 that receives a supply voltage VDD, and an n-type transistor 310 (e.g., n-type metal-oxide-semiconductor (NMOS) transistor) coupled between the output terminal 304 and a ground potential 312. The respective gate terminals of the p-type transistor 306 and n-type transistor 310 are coupled to the input terminal 302 to receive the input signal. Such an input signal is to be provided, for example, from an output terminal of similar inverter circuitry (not shown) which is to be coupled to inverter circuitry 300—e.g., wherein output terminal 304 is to be coupled to an input terminal of said similar inverter circuitry.

The inverter circuitry 300 further comprises a control transistor 314 (e.g., a p-type transistor) coupled in parallel with the p-type transistor 306, and another control transistor 320 (e.g., an n-type transistor) coupled in parallel with the n-type transistor 310. The respective gate terminals of the p-type transistor 314 and n-type transistor 320 are coupled to receive an adjustment voltage Vadj (e.g., an analog voltage). In one such embodiment, transistors 314, 320 facilitate the control of a drive strength of the inverter circuitry 300, wherein such control is based on the adjustment voltage Vadj.

In some embodiments, the inverter circuitry 300 further comprises a power gate transistor 316 (e.g., a p-type transistor) coupled between the p-type transistor 306 and the supply terminal 308. The power gate transistor 316 receives a power gate signal Pgate at its gate terminal to selectively power the inverter circuitry 300 on or off—e.g., wherein signal Pgate is a reset signal provided via deterministic feedback loop 214. For example, the inverter circuitry 300 is powered off when the power gate transistor 316 is off and is powered on when the power gate transistor 316 is on. The inverter circuitry 300 further comprises a reset transistor 318 coupled between the output terminal 304 and the ground potential 312 (e.g., in parallel with the n-type transistor 310). The gate terminal of the reset transistor 318 receives the power gate signal Pgate (e.g., the gate terminal of the reset transistor 318 is coupled with the gate terminal of the power gate transistor 316). The reset transistor 318 turns on, responsive to the power gate signal Pgate, when the power gate transistor 316 is off, thereby pulling the output terminal 304 to ground. The reset transistor 318 is off when the power gate transistor 316 is on.

In some embodiments, inverter circuitry 300 includes any of various alternative arrangements of power gating transistors and/or reset transistors. For example, instead of the single power gate transistor 316, inverter circuitry 300 alternatively comprises two p-type power gate transistors which are coupled each between Vdd 308 and a different respective one of p-type transistors 306, 314—e.g., wherein said two p-type power gate transistors are coupled to be selectively activated by the power gate signal Pgate. Additionally or alternatively, in various embodiments, inverter circuitry 300 further comprises another n-type reset transistor which is coupled in parallel with reset transistor 318 between the output terminal 304 and the ground potential 312, and is coupled to be selectively activated by the power gate signal Pgate.

Referring again to FIG. 2, the stochastic feedback circuit 204 adjusts the drive strength of the inverter 216a and/or inverter 216b based on the value of the most recent bit of the output signal. For example, stochastic feedback circuit 204 variously charges or discharges capacitors 240a, 240b of the charge pump 208—e.g., via nodes 234a, 234b, respectively—based on the respective values of the output signals esdata, esdata_b. In some embodiments, the stochastic feedback loop adjusts the drive strength based on multiple earlier bits and/or based on a combination of earlier and subsequent bits. For example, the stochastic feedback loop uses a digital filter or a weighted average of multiple bits to determine the drive strength adjustment. In some embodiments, a valid option for the stochastic feedback loop comprises maintaining the previous value for the drive strengths of the inverters 216a, 216b.

The charge pump 208 uses the respective voltages Acap, Bcap at nodes 234a, 234b to provide respective adjustment voltages Vadja, Vadjb (generically represented herein as Vadj) to the inverters 216a, 216b. In the illustrative embodiment shown by FIG. 3A, one such voltage Vadj is provided to the control transistors 314, 320 of inverter circuitry 300. The adjustment voltages provided to inverters 216a, 216b are illustrated by a differential voltage Vdiff, which represents the voltage difference between the voltage Vadja (e.g., voltage Acap at node 234a) and the voltage Vadjb (e.g., voltage Bcap at node 234b). Furthermore, voltage Vcm represents a common mode voltage between the respective voltages Vadja, Vadjb which are provided to inverters 216a, 216b.

For example, if the value of a bit of the output signal esdata is a logic 1, the node 234a is discharged and/or the node 234b is charged, to increase the likelihood that the next bit of the output signal esdata will have a value of logic 0. If the value of the output signal esdata is logic 0, the node 234a is charged and/or the node 234b is discharged, to increase the likelihood that the next bit of the output signal esdata will have a value of logic 1. The nodes 234a, 234b are charged or discharged by a discrete amount of voltage (e.g., referred to as a step size). In some embodiments, the step size is adjustable, as further discussed below.

In various embodiments, the deterministic feedback circuit 212 provides a deterministic feedback signal (e.g., via deterministic feedback loop 214) to the entropy source 202 to form an oscillator and thereby generate successive bits for the output signal esdata and/or output bar signal esdata_b. For example, the deterministic feedback circuit 212 determines when the output bit of the entropy source 202 has registered (e.g., when A and B have different logical values), and resets the entropy source 202 responsive to the determination that the output bit has registered. In some embodiments, the deterministic feedback signal corresponds to an XOR function between A and B (e.g., a NAND function between !A and !B), and/or another suitable logical function or set of functions.

The deterministic feedback signal is provided to the inverters 216a, 216b (e.g., to the power gate transistor 316 as the power gate signal Pgate) to power off the inverters 216a, 216b when the entropy source 202 is reset (e.g., using the power gate transistor 316 and reset transistor 318). When both A and B are logic 0, the deterministic feedback signal (e.g., A XOR B) changes from logic 1 to logic 0, thereby causing the inverters 216a, 216b to be powered up again (e.g., when the power gate transistor 316 turns on). Upon power up, the entropy source 202 will generate the next bit of the output signal esdata and output bar signal esdata_b based on the contention of the inverters 216a, 216b.

In various embodiments, the deterministic feedback signal is delayed on the deterministic feedback loop 214 (e.g., by one or more delay cells, such as buffers and/or inverters, as further discussed below) to provide a desired frequency of oscillation of the deterministic feedback loop 214. If the delayed version of the deterministic feedback signal is used to reset the entropy source 202, the inverters 216a, 216b of the entropy source 202 draw direct current (DC) during half of the cycle of the deterministic feedback loop 214 (e.g., while the power gate transistor 316 is on). Accordingly, in various embodiments described herein, the deterministic feedback circuit 212 passes a pre-delay version of the deterministic feedback signal (e.g., a version that bypasses the delay cells) to the entropy source 202 to reset the entropy source 202 when it is detected that the output bit of the entropy source 202 has registered (e.g., when A XOR B is logic 1), and use a delayed version of the deterministic feedback signal (e.g., a version that passes through the delay cells) to power the entropy source 202 back on to generate the subsequent value of the output signal esdata and/or output bar signal esdata_b. Therefore, the entropy source 202 and/or inverters 216a, 216b are powered on for less than half of the cycle of the deterministic feedback loop 214. For example, in some embodiments, the entropy source 202 and/or inverters 216a, 216b are powered on for less than 45% of the cycle of the deterministic feedback loop 214, such as less than 25% of the cycle. In some embodiments the entropy source 202 and/or inverters 216a, 216b are powered on for the minimum duration required to register the output bit irrespective of the cycle.

Some embodiments variously provide for improved control of the respective drive strengths of two cross-coupled inverter circuits (such as two CMOS inverters) by using two additional inverter circuits—e.g., in lieu of using merely two p-type transistors each to variously shunt current conduction by the two cross-coupled inverter circuits. By way of illustration and not limitation, a review of inverter circuitry 300 reveals that transistors 306, 310 are coupled to provide a first CMOS inverter which is coupled between a node n0 and the terminal for ground potential 312. Furthermore, transistors 314, 320 are coupled to provide a second CMOS inverter which is similarly coupled between the node n0 and the terminal 312. In providing such an arrangement of two CMOS inverters, some embodiments better maintain and/or otherwise improve the randomness of an entropy source—e.g., by mitigating a tendency of the common mode voltage Vcm to approach a level which results in the entropy source consistently settling into the same output state.

For example, if inverter circuitry 300 were to omit control transistor 320, inverter circuitry 300 could still accommodate cross-coupling with a similarly modified inverter circuitry to facilitate some functionality as an entropy source. More particularly, if the value of a bit of the output signal esdata were a logic 1, such a modified entropy source (in some conditions) would still be able to provide functionality to increase the likelihood that the next bit of the output signal esdata will have a value of logic 0. However, although such an entropy source would be sensitive to a differential voltage Vdiff between the adjustment voltages Vadja, Vadjb, it would not be sufficiently corrective (or preventive) of the common mode voltage Vcm approaching an excessively high level (or an excessively low level).

By contrast, in providing control transistor 320 (i.e., in addition to control transistor 314), inverter circuitry 300 can selectively enable an additional conductive path between output terminal 304 and terminal 312 based on voltage Vadj. Where an entropy source according to one embodiment comprises two instances of such inverter circuitry (the two instances in a cross-coupled arrangement), the entropy source is relatively more likely to remain sufficiently metastable (wherein output signal 304 varies sufficiently between settling into logic 1, and settling into logic 0. In some embodiments, a random number generator comprising such an entropy source is self-regulating to maintain a state wherein the common mode voltage Vcm is substantially equal to one half (½) of a difference between the supply voltage VDD at terminal 308 and the reference potential at terminal 312. As a result, some embodiments variously provide an extended tuning range of an entropy source—e.g., extended to a substantially a full rail-to-rail range. This extended tuning range facilitates an increased dynamic range of operation of an entropy source, which in turn relaxes the requirements for the step size of changes to a given one of adjustment voltages Vadja, Vadjb.

Figure 3B:
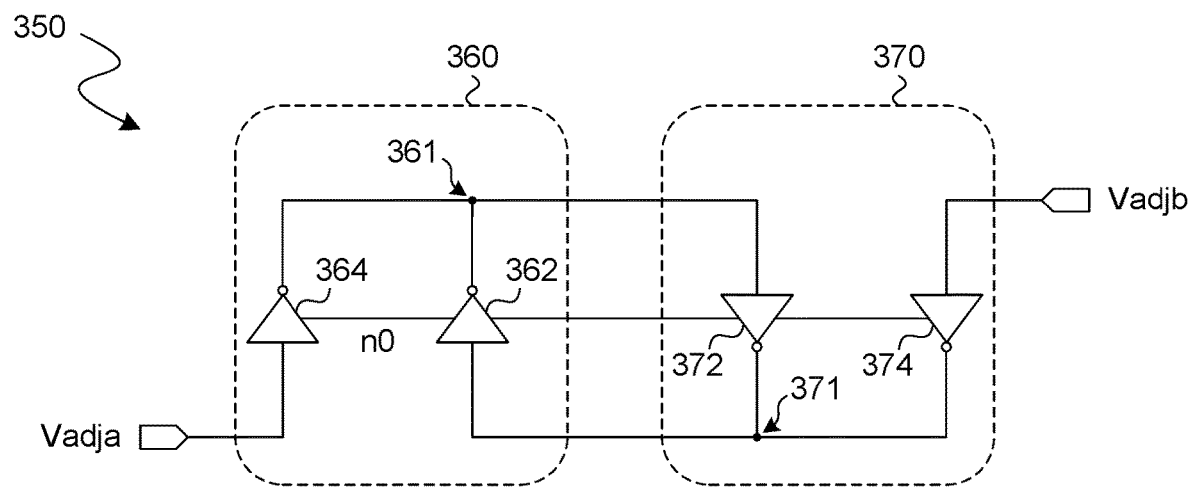
FIG. 3B shows a circuit diagram illustrating features of an entropy source comprising inverter circuitry according to an embodiment.

FIG. 3B shows features of an entropy source 350 according to one example embodiment. For example, entropy source 350 provides functionality of entropy source 202, or includes features of inverter circuitry 300 (for example). As shown in FIG. 3B, entropy source 350 comprises inverter circuitry 360 to receive a first adjustment voltage Vadja, and other inverter circuitry 370 to receive a second adjustment voltage Vadjb. Inverter circuitry 360 comprises a CMOS inverter 362, and a CMOS inverter 364—e.g., wherein inverter circuitry 370 similarly comprises a CMOS inverter 372, and a CMOS inverter 374. The CMOS inverter 362, and the CMOS inverter 372 are cross-coupled with each other between two nodes 361, 371—e.g., wherein an output terminal of CMOS inverter 362 is coupled to an input terminal of CMOS inverter 372 via node 361, and wherein an output terminal of CMOS inverter 372 is coupled to an input terminal of CMOS inverter 362 via node 371.

In some embodiments, each of inverter circuitry 360 and inverter circuitry 370 provides respective functionality such as that of inverter circuitry 300. For example, in one such embodiment, CMOS inverter 362 comprises transistors 306, 310, and CMOS inverter 364 comprises transistors 314, 320. In an alternative embodiment, CMOS inverter 372 comprises transistors 306, 310, and CMOS inverter 374 comprises transistors 314, 320.

The CMOS inverter 364—an output terminal of which is coupled to node 361—is configured to receive the first adjustment voltage Vadja, which for example, is generated with a stepper circuit and a charge pump (not shown) based on a feedback signal. In one such embodiment, the feedback signal is based on an output from the entropy source 350. Furthermore, the CMOS inverter 374—an output terminal of which is coupled to node 371—is configured to receive the second adjustment voltage Vadjb, which is similarly generated with the stepper circuit and the charge pump based on the feedback signal.

In various embodiments, the entropy source 350 is operable to settle into a state wherein respective signals are provided at nodes 361, 371, and wherein one of the signals represents a logic state which is complementary to that represented by the other of the signals. In one such embodiment, the CMOS inverters 364, 374 are coupled to selectively conduct respective currents each via a node n0 by which inverters 362, 372 draw power. By way of illustration and not limitation, node n0 in entropy source 350 corresponds to node n0 in inverter circuitry 300. Whether or how the respective currents are conducted by CMOS inverters 364, 374 is based on voltages Vadja, Vadjb, respectively. The drawing of such currents by CMOS inverters 364, 374 variously contribute to entropy source 350 settling into a particular state of the respective signals provided at nodes 361, 371.

In some embodiments, entropy source 350 further comprises one or more additional transistors (not shown)—e.g., comprising transistor 316 and/or transistor 318—which are coupled to power and/or reset some or all of CMOS inverters 362, 364, 372, 374. By way of illustration and not limitation, such one or more additional transistors comprise a first transistor which is coupled to provide a supply voltage—e.g., based on the signal Pgate provided to transistor 316—to some or all of CMOS inverters 362, 364, 372, 374. In one such embodiment, this first transistor is operable to selectively provide the supply voltage to each of the CMOS inverter 362, and the CMOS inverter 372. Additionally or alternatively, such one or more additional transistors comprise a second transistor—e.g., transistor 318—which is coupled between node 361 (or alternatively, node 371) and another node which it to provide a reference potential. In one such embodiment, the second transistor is coupled to receive the Pgate signal and, based thereon, to conduct a first current to pull down a voltage at node 361 (and/or a voltage at node 371).

Accordingly, in various embodiments, a random number generator circuit comprises entropy source 350, and first circuitry (not shown) which is coupled thereto. For example, CMOS inverter 362 comprises a first input terminal and a first output terminal, wherein CMOS inverter 372 comprises a second input terminal which is coupled to the first output terminal at the node 361, and a second output terminal which is coupled to the first input terminal at the node 371. Furthermore, the CMOS inverter 364 comprises a third input terminal to receive a voltage Vadja, and a third output terminal which is coupled at the node 361—e.g., wherein the entropy source 350 is to generate a first signal (e.g., the voltage signal Acap) at the node 361.

In one such embodiment, the first circuitry—which is to be coupled to the entropy source 350—provides some or all of the functionality of charge pump 208, stochastic feedback circuit 204, and deterministic feedback circuit 212 (for example). For example, the first circuitry is to generate the voltage Vadja based on a first value (e.g., a first bit or other representation of a first logic state) of the first signal—e.g., based on a feedback signal which includes or is otherwise based on the first value. Based on the voltage Vadja, the entropy source 350 is to generate a second value (e.g., a second bit or other representation of a second logic state) of the first signal—e.g., wherein the second value is a next generated value of the first signal after the first value.

In some embodiments, the entropy source 350 further comprises the CMOS inverter 374, which comprises a fourth input terminal to receive a voltage Vadjb, and a fourth output terminal which is coupled at the node 371. In one such embodiment, the entropy source 350 is further to generate a second signal (e.g., the voltage signal Bcap) at the node 371. The first circuitry is further to generate the voltage Vadjb based on a third value of the second signal—e.g., based on a feedback signal which includes or is otherwise based on the third value. Based on the voltage Vadjb, the entropy source 350 is to generate a fourth value of the second signal—e.g., wherein the fourth value is a next randomly generated value of the second signal after the third value.

In an embodiment, the CMOS inverter 362, the CMOS inverter 372 each comprise a respective first transistor (e.g., corresponding functionally to one of p-type transistor 306) which is coupled at a third node such as the node n0 shown. Similarly, the CMOS inverter 364, the CMOS inverter 374 each comprise a respective first transistor (e.g., corresponding functionally to p-type transistor 314) which is also coupled at the third node—e.g., wherein the CMOS inverters 362, 364, 372, and 374 each draw power via the third node. In various embodiments the CMOS inverters 362, 372 each further comprise a respective second transistor (e.g., corresponding functionally to n-type transistor 310) which is coupled at a fourth node—such as that at terminal 312—which is to provide a reference potential such as a ground voltage. Similarly, the CMOS inverters 364, 374 each comprise a respective second transistor (e.g., corresponding functionally to n-type transistor 320) which is coupled at the fourth node.

Figure 4A:
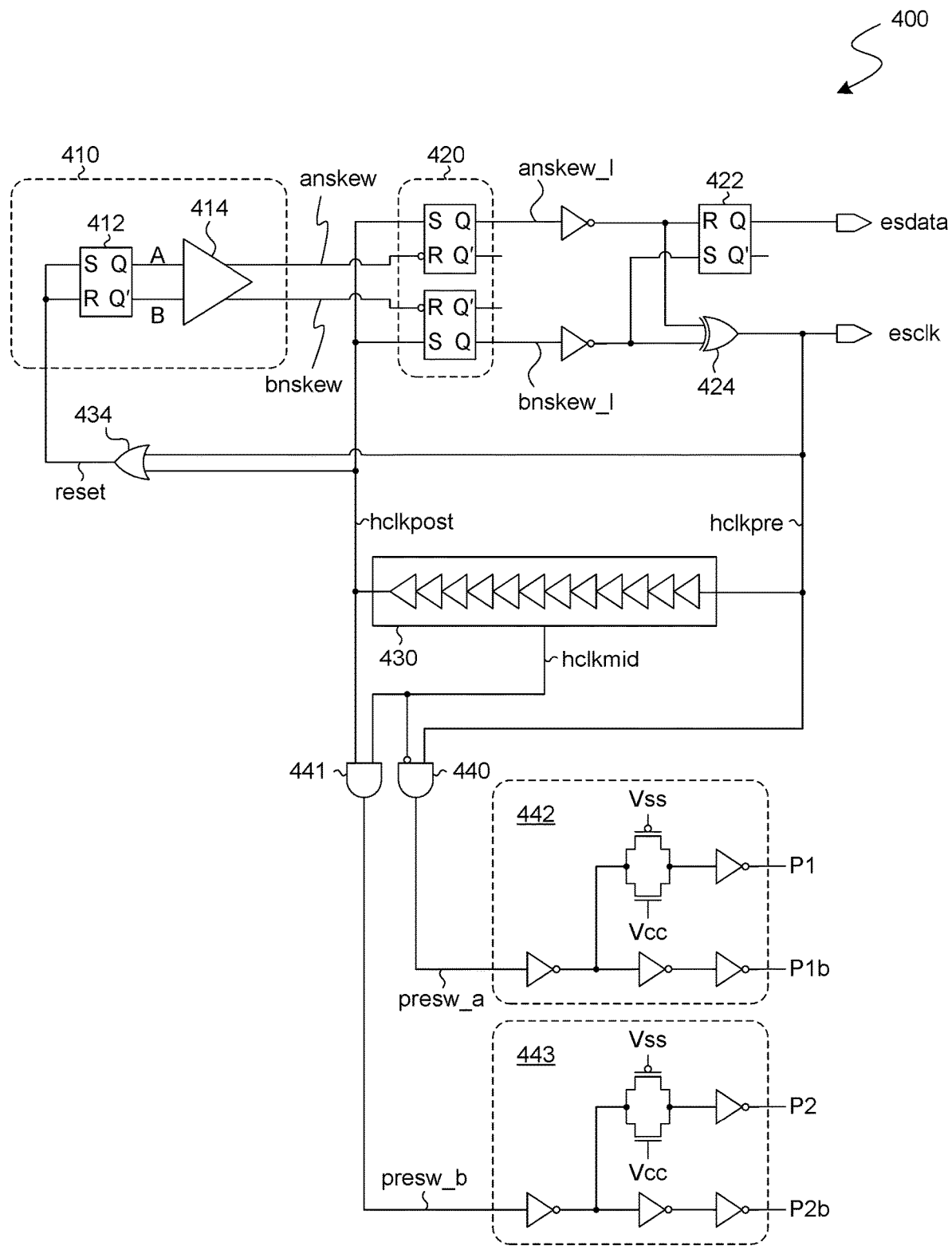
FIGS. 4A, 4B shows circuit diagrams each illustrating features of a respective random number generator according to a corresponding embodiment.

FIG. 4A illustrates a circuit 400 that provides functionality of entropy source 202 and deterministic feedback circuit 212 in accordance with some embodiments. The circuit 400 comprises an entropy source 410 and a deterministic feedback circuit coupled thereto. The entropy source 410 is illustrated as comprising SR latch circuitry 412 and a differential buffer 414—e.g., wherein SR latch 412 comprises two instances of cross-coupled circuits which each correspond functionally to inverter circuitry 300. In one such embodiment, the cross-coupled circuits of SR latch 412 are each to receive a reset signal which (for example) corresponds functionally to the signal Pgate shown in FIG. 3.

In the example embodiment shown, SR latch 412 is configured to generate an output signal A and a complementary output bar signal B, each at a respective output terminal. In response to the reset signal—e.g., a deterministic feedback signal—being deasserted, output signal A and output bar signal B variously settle each to a respective one of two complementary logic states. The circuit 400 further comprises latch circuitry 420—e.g., comprising the illustrative SR latches shown—which is coupled to receive complementary signals anskew, bnskew which differential buffer 414 generates based on output signal A and output bar signal B. In an embodiment, latch circuitry 420 synchronizes a timing of a settling to one logic state by a signal anskew_1 which is based on signal anskew, and another settling to an opposite logic state by a signal bnskew_1 which is based on signal bnskew.

In an embodiment, circuit 400 further comprises SR latch circuitry 422 (or other suitable circuitry) which generates, based on signals anskew_1 and bnskew_1, a signal esdata which represents a randomly generated bit value. In one such embodiment, SR latch circuitry 422 further generates another signal esdata_b which is complementary to signal esdata.

Circuit 400 further comprises detection logic including one or more logic gates, such as inverters and the illustrative XOR gate 424 shown. However, such detection logic comprises any of various other suitable logic gates, in alternative embodiments. Based on signals anskew_1 and bnskew_1, the detector logic provides an output signal, referred to as pre-delay feedback signal hclkpre. For example, in response to the output of the entropy source 410 stabilizing (e.g., when the output signal A and output bar signal B settle to different logic state), the pre-delay feedback signal hclkpre transitions from logic 0 to logic 1. Although some embodiments are not limited in this regard, pre-delay feedback signal hclkpre is further provided (for example) as a signal esclk which is to coordinate operation of circuit 400 with other circuitry (not shown) that receives one or both of signals esdata, esdata_b.

In some embodiments, the circuit 400 further comprises a split feedback path for the pre-delay feedback signal hclkpre. For example, a reset circuit 434 (e.g., an OR gate) receives the pre-delay feedback signal hclkpre and a delayed version of the pre-delay feedback signal (the delayed feedback signal hclkpost). The delayed feedback signal hclkpost is delayed by a delay line 430 (e.g., by buffers and/or inverters thereof). A reset signal, output by the reset circuit 434, is passed as a feedback to the input terminals of the SR latch circuitry 412. When the pre-delay feedback signal hclkpre transitions from logic 0 to logic 1, the reset circuit 434 passes the logic 1 to its output terminal, thereby causing the reset signal to transition to logic 1. The reset signal having logic 1 causes the SR latch circuitry 412 to reset.

The SR latches of latch circuitry 420 continue to store the values of the signals anskew and bnskew, until the delayed feedback signal hclkpost transitions from logic 0 to logic 1 (e.g., after the delay provided by delay cells 430). In one example embodiment, the SR latches of latch circuitry 420 comprise traditional complementary metal-oxide-semiconductor (CMOS) latches, and thus do not consume DC current to hold the values of the signals anskew and bnskew. When the delayed feedback signal hclkpost transitions to logic 1, the signals anskew, bnskew are each at logic 1 (for example). The output of the XOR gate 424 transitions the pre-delay feedback signal hclkpre to logic 0 in response to both of its inputs being logic 1. When the delayed feedback signal hclkpost thereafter transitions from logic 1 to logic 0, the reset signal passed by reset circuit 434 transitions to logic 0, thereby powering the SR latch circuitry 412 back on and re-starting the cycle of the deterministic feedback loop.

Accordingly, the circuit 400 is able to power on the entropy source 410 for only the amount of time it takes for the output of the entropy source 410 to stabilize (e.g., for the bit to register), and the amount of time the entropy source 410 is powered on does not depend on the frequency at which the deterministic feedback loop of the circuit 400 operates. Therefore, the circuit 400 consumes less power than prior entropy source feedback circuits. In some embodiments, cross-coupled inverter circuits of the entropy source 410 are powered on for the minimum duration required to register the output bit irrespective of the cycle of the deterministic feedback loop.

Furthermore, additional inverter circuits of SR latch circuitry 412 (e.g., providing functionality of CMOS inverter 364 and CMOS inverter 374) help mitigate a drift of SR latch circuitry 412 which would otherwise decrease the randomness of the output signal A and the output bar signal B over time. For example, as described further herein, such additional inverter circuits variously operate to keep a common mode voltage of SR latch circuitry 412 at substantially one half of a difference between a supply voltage Vdd and a reference potential Vss (such as a ground voltage). In an embodiment, such operation is based on adjustment voltages which, for example, are generated based on a feedback of the complementary signals esdata and esdata_b.

In various embodiments, the frequency of oscillation of the deterministic feedback loop is adjustable, for example, by adjusting the delay provided by the delay path (e.g., the delay cells 430 of circuit 400). Additionally, or alternatively, the step size of an adjustment voltage Vadj generated by the stochastic feedback loop (e.g., the stochastic feedback circuit 204 of circuit 200) is adjustable.

In some embodiments, circuit 400 further includes, or is to be coupled to, charge pump circuitry (not shown) which provides functionality such as that of charge pump 208. For example, SR latch circuitry 412 comprises two cross-coupled CMOS inverter circuits—e.g., wherein cross-coupled logic gates (such as NOR gates) of SR latch circuitry 412 each include a respective CMOS inverter circuit. In one such embodiment, signal esdata and signal esdata_b are provided as feedback to the charge pump. Based on signal esdata and signal esdata_b, the charge pump provides to SR latch circuitry 412 two adjustment voltages Vadja and Vadjb, which promote the randomness with which the cross-coupled inverter circuits each settle into representing a respective logic state with a corresponding one of output signal A and output bar signal B.

In various embodiments, the charge pump circuitry comprises switch circuits which are variously operated with control signals that, for example, include or are otherwise based on the illustrative control signals cpa, cpb shown. By way of illustration and not limitation, a signal presw_a is generated with one or more logic gates (e.g., including logic gate 440) based on the pre-delay feedback signal hclkpre and another delayed version (represented as signal hclkmid) of the pre-delay feedback signal hclkpre. In one such embodiment, another signal presw_b is generated with one or more logic gates (e.g., including AND gate 441) based on the delayed feedback signal hclkmid and the other delayed feedback signal hclkpost. Due to the functionality of logic gates 440, 441, and of delay line 430, signal presw_a exhibits successive pulses which are nonoverlapping with successive pulses of signal presw_b. In an embodiment, circuitry 442 of circuit 400 is coupled to generate, based on signal presw_a, two switch control signals P1, P1$b$ which are complementary to each other. Furthermore, additional circuitry 443 of circuit 400 generates, based on signal presw_b, another two switch control signals P2, P2$b$ which are complementary to each other.

Figure 4B:
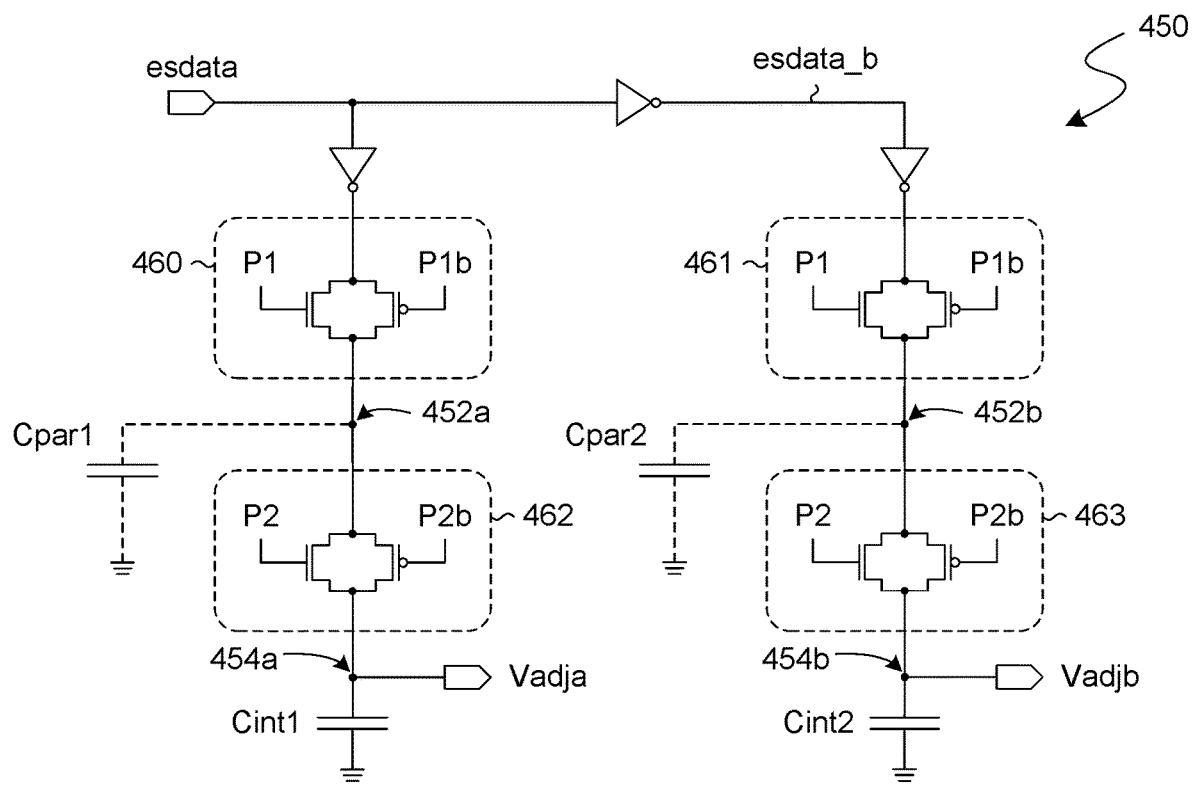

For example, FIG. 4B shows features of charge pump circuitry 450 which provides functionality such as that of charge pump 208. In the example embodiments shown, circuitry 450 comprises a first circuit path which is to generate an adjustment voltage Vadja based on a signal esdata (e.g., wherein the signal esdata is provided to circuitry 450 by SR latch circuitry 422). By way of illustration and not limitation, the first circuit path of circuitry 450 comprises switch circuitry 460, switch circuitry 462, and capacitor Cint1 which, for example, correspond functionally to switch circuit 220$a$, switch circuit 230$a$, and capacitor 240$a$ (respectively). Switch circuitry 460 operates based on complementary switch control signals P1, P1$b$ which (for example) provide functionality of control signal 222$a$—e.g., wherein switch circuitry 462 operates based on complementary switch control signals P2, P2$b$ which provide functionality of control signal 232$a$. In an embodiment, a node 452$a$ (e.g., corresponding to node 224$a$) comprises a conductor which extends to one or more terminals of switch circuitry 460 and to one or more terminals of terminals of switch circuitry 462, but which does not further extend, for example, to a terminal of any passive capacitor component. Another node 454$a$ (corresponding to node 234$a$, for example) provides the adjustment voltage Vadja.

In one such embodiment, circuitry 450 further comprises a second circuit path which is to generate an adjustment voltage Vadjb based on a signal esdata_b which is complementary to the signal esdata. By way of illustration and not limitation, the second circuit path of circuitry 450 comprises switch circuitry 461, switch circuitry 463, and capacitor Cint2 which, for example, correspond functionally to switch circuit 220$b$, switch circuit 230$b$, and capacitor 240$b$ (respectively). Switch circuitry 460 operates based on the complementary switch control signals P1, P1$b$—e.g., wherein switch circuitry 462 operates based on the complementary switch control signals P2, P2$b$. In an embodiment, a node 452$b$ (e.g., corresponding to node 224$b$) comprises a conductor which extends to one or more terminals of switch circuitry 461 and to one or more terminals of terminals of switch circuitry 463, but which does not further extend, for example, to a terminal of any passive capacitor component. Another node 454$b$ (corresponding to node 234$b$, for example) provides the adjustment voltage Vadjb.

Figure 4C:
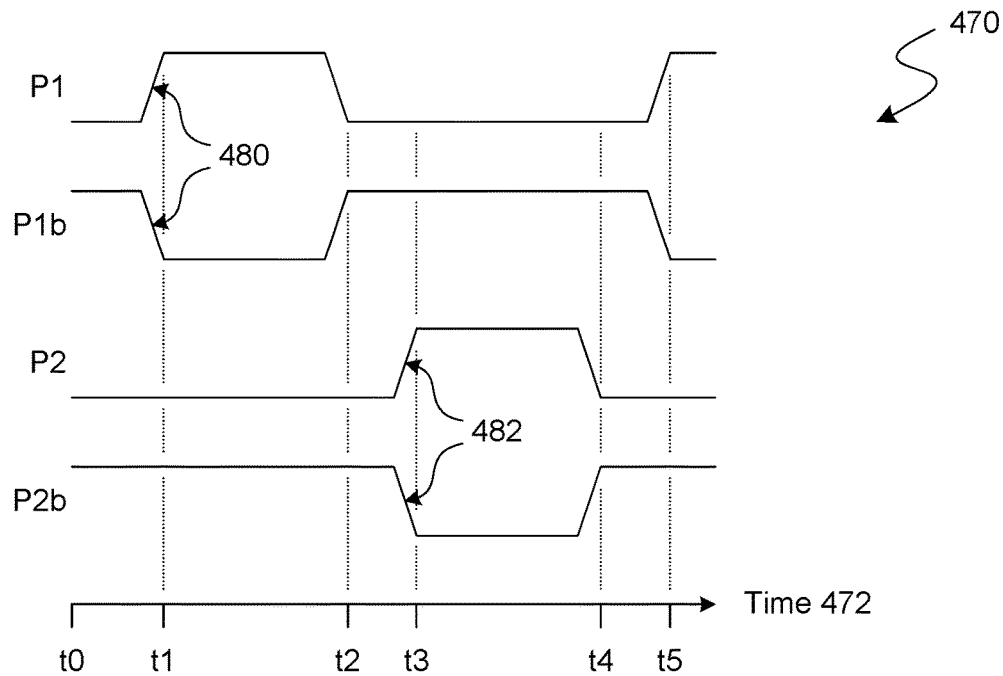
FIG. 4C shows a timing diagram illustrating features of control signals to facilitate operation of a random number generator according to an embodiment.

One example of operations with circuitry 450 is illustrated in FIG. 4C, which shows a timing diagram 470 representing features of switch control signals P1, P1$b$, P2, and P2$b$ over a period of time 472. In an illustrative scenario according to one embodiment, respective transitions 480 of the complementary switch control signals P1, P1$b$ take place at a time t1 to variously activate switch circuitry 460 and switch circuitry 461. Based on transitions 480, a parasitic capacitance (represented at Cpar1) between node 452$a$ and another node—e.g., one which provides a supply voltage or a reference potential—is at least partially charged (or discharged) based on an inverted version of the signal esdata. Alternatively or in addition, based on transitions 480, a parasitic capacitance Cpar2 between node 452$b$ and the other node is at least partially discharged (or charged) based on an inverted version of the signal esdata_b.

Subsequently, while switch circuitry 460 and switch circuitry 461 are inactive (e.g., after deactivation at time t2), respective transitions 482 of the complementary switch control signals P2, P2$b$ take place at a time t3 to variously activate switch circuitry 462 and switch circuitry 463. Based on transitions 482, the parasitic capacitance Cpar1 is switchedly coupled to at least partially charge (or discharge) capacitor Cint1. Similarly, the parasitic capacitance Cpar2 is switchedly coupled to at least partially discharge (or charge) capacitor Cint2. Subsequently, while switch circuitry 462 and switch circuitry 463 are inactive (e.g., after deactivation at time t4), an entropy source, comprising cross-coupled inverter circuits (each comprising a respective two CMOS inverters), is powered and/or otherwise enabled to sample adjustment voltages Vadja, Vadjb, which promote a randomness with which the entropy source settles into representing two logic states.

Figure 5:
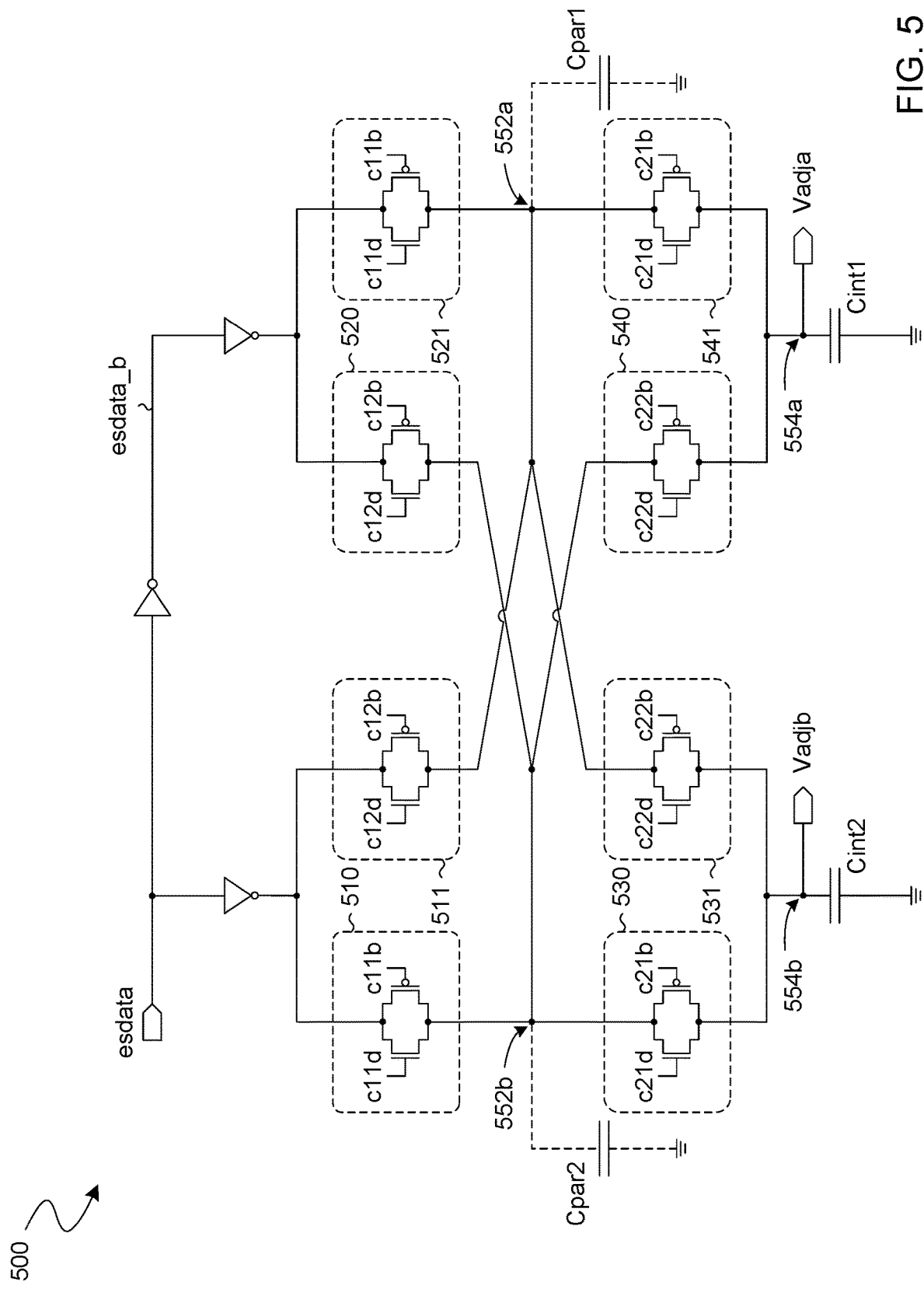
FIG. 5 shows a circuit diagram illustrating features of a stepper circuit according to an embodiment.

FIG. 5 shows features of circuitry 500 which provides functionality such as that of charge pump 208. Circuitry 500 illustrates one example of a charge pump which is able to promote randomness of an entropy source by using dynamic element matching to generate adjustment voltages.

In the example embodiment shown, circuitry 500 comprises switch circuitry 511 and switch circuitry 521 which—based (respectively) on inverted versions of signals esdata and esdata_b—are to variously charge or discharge a parasitic capacitance Cpar1 at a node 552$a$. Circuitry 500 further comprises switch circuitry 510 and switch circuitry 520 which—based (respectively) on inverted versions of signals esdata and esdata_b—are to variously charge or discharge a parasitic capacitance Cpar2 at a node 552$b$. Furthermore, circuitry 500 comprises switch circuitry 541 and switch circuitry 540 which—based on respective charges at nodes 552$a$, 552$b$ (respectively)—are to variously charge or discharge a capacitor Cint1 which is coupled at a node 554$a$. Further still, circuitry 500 comprises switch circuitry 531 and switch circuitry 530 which—based on respective charges at nodes 552$a$, 552$b$ (respectively)—are to variously charge or discharge a capacitor Cint2 which is coupled at a node 554$b$.

In one such embodiment, circuitry 500 further comprises, or is to coupled to, an entropy source (not shown) which is to sample or otherwise detect the respective adjustment voltages Vadja, Vadjb at nodes 554$a$, 554$b$. For example, in various embodiments, nodes 554$a$, 554$b$ correspond functionally to nodes 234$a$, 234$b$ and/or CMOS inverters 364, 374 are coupled to receive adjustment voltages Vadja, Vadjb (respectively) from nodes 554$a$, 554$b$.

Figure 6:
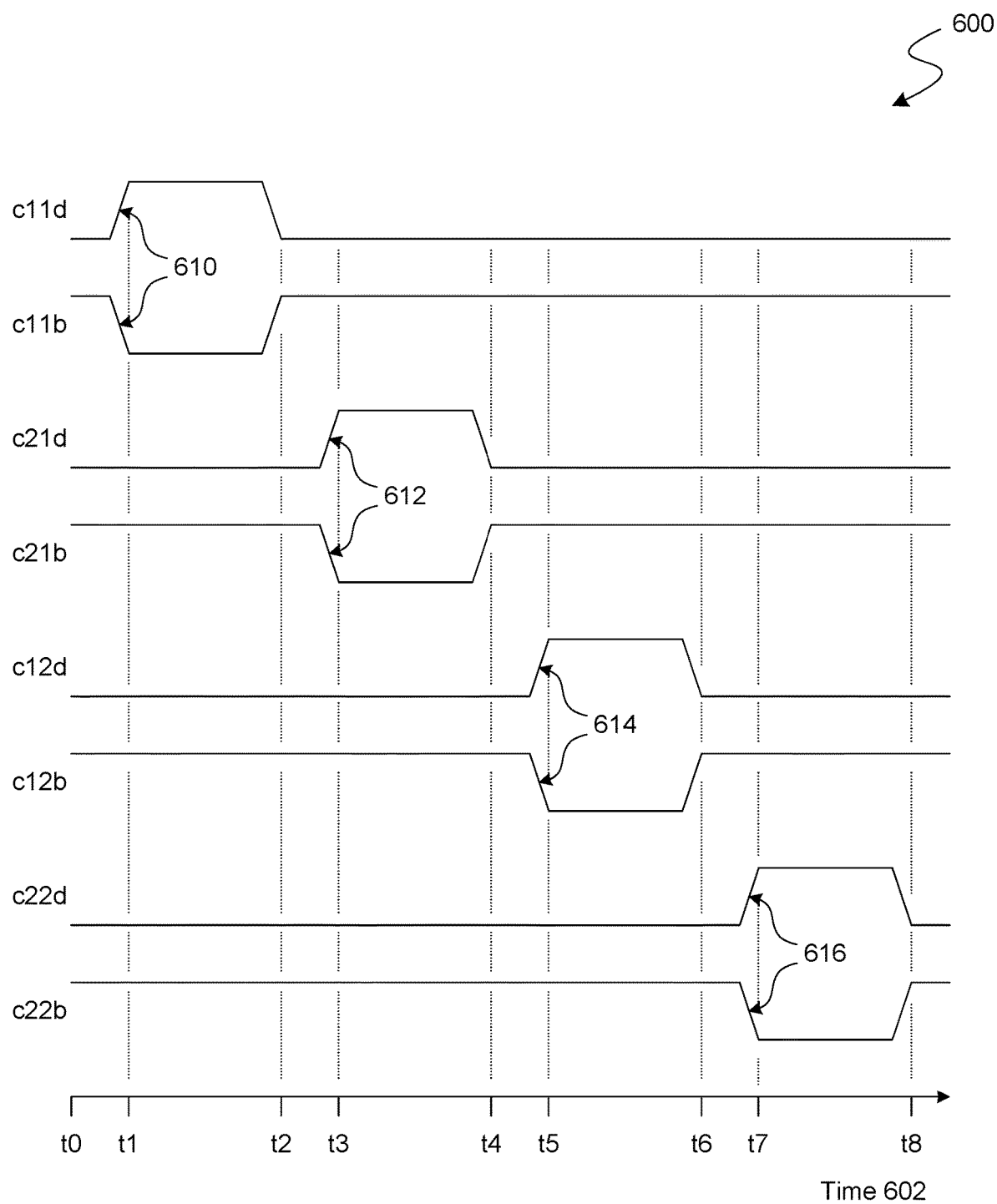
FIG. 6 shows a timing diagram illustrating features of control signals to facilitate operation of a random number generator according to an embodiment.

To facilitate generation of adjustment voltages Vadja, Vadjb, switch circuitry 510 and switch circuitry 521 are operated with control signals c11$d$, c11$b$ which are complementary to each other—e.g., wherein switch circuitry 511 and switch circuitry 520 are operated with control signals c12$d$, c12$b$ which are complementary to each other. Furthermore, switch circuitry 530 and switch circuitry 541 are operated with control signals c21$d$, c21$b$ which are complementary to each other—e.g., wherein switch circuitry 531 and switch circuitry 540 are operated with control signals c22d, c22b which are complementary to each other In the example embodiment shown, dynamic element matching is performed with circuitry 500 using control signal pairs (c11d/c11b), (c12d/c12b), (c21d/c21b), and (c22d/c22b) which are variously asserted during respective periods which are non-overlapping. For example, FIG. 6 shows a timing diagram 600 representing charge pump operations using such control signal pairs (c11d/c11b), (c12d/c12b), (c21d/c21b), and (c22d/c22b), according to an embodiment. In an illustrative embodiment shown, respective transitions 610 of the complementary switch control signals c11d, c11b take place at a time t1 to variously activate switch circuitry 510 and switch circuitry 521 (e.g., while all other switch circuitry of circuitry 500 is inactive). Based on transitions 610, the parasitic capacitance Cpar1 is at least partially charged (or discharged) based on an inverted version of the signal esdata_b. Furthermore, based on transitions 610, the parasitic capacitance Cpar2 is at least partially discharged (or charged) based on an inverted version of the signal esdata.

Subsequently, respective transitions 612 of the complementary switch control signals c21d, c21b take place at a time t3 to variously activate switch circuitry 530 and switch circuitry 541 (e.g., while all other switch circuitry of circuitry 500 is inactive). Based on transitions 612, the parasitic capacitance Cpar1 is switchedly coupled to at least partially charge (or discharge) capacitor Cint1. Similarly, the parasitic capacitance Cpar2 is switchedly coupled to at least partially discharge (or charge) capacitor Cint2.

In some embodiments, after the transitions 610, 612, esdata and esdata_b are updated by the entropy source based on the adjustment voltages Vadja, Vadjb. Subsequently, respective transitions 614 of the complementary switch control signals c12d, c12b take place at a time t5 to variously activate switch circuitry 511 and switch circuitry 520 (e.g., while all other switch circuitry of circuitry 500 is inactive). Based on transitions 614, the parasitic capacitance Cpar1 is at least partially charged (or discharged) based on an inverted version of the signal esdata. Furthermore, based on transitions 614, the parasitic capacitance Cpar2 is at least partially discharged (or charged) based on an inverted version of the signal esdata_b.

Subsequently, respective transitions 616 of the complementary switch control signals c22d, c22b take place at a time t7 to variously activate switch circuitry 531 and switch circuitry 540 (e.g., while all other switch circuitry of circuitry 500 is inactive). Based on transitions 616, the parasitic capacitance Cpar1 is switchedly coupled to at least partially charge (or discharge) capacitor Cint2. Similarly, the parasitic capacitance Cpar2 is switchedly coupled to at least partially discharge (or charge) capacitor Cint1. Subsequently, while all switch circuitry of circuitry 500 is inactive (e.g., after deactivation of switch circuitry 531 and switch circuitry 540 at time t8), an entropy source comprising cross-coupled inverter circuits—each inverter circuit comprising a respective two CMOS inverters—is powered and/or otherwise enabled to sample adjustment voltages Vadja, Vadjb.

Figure 7:
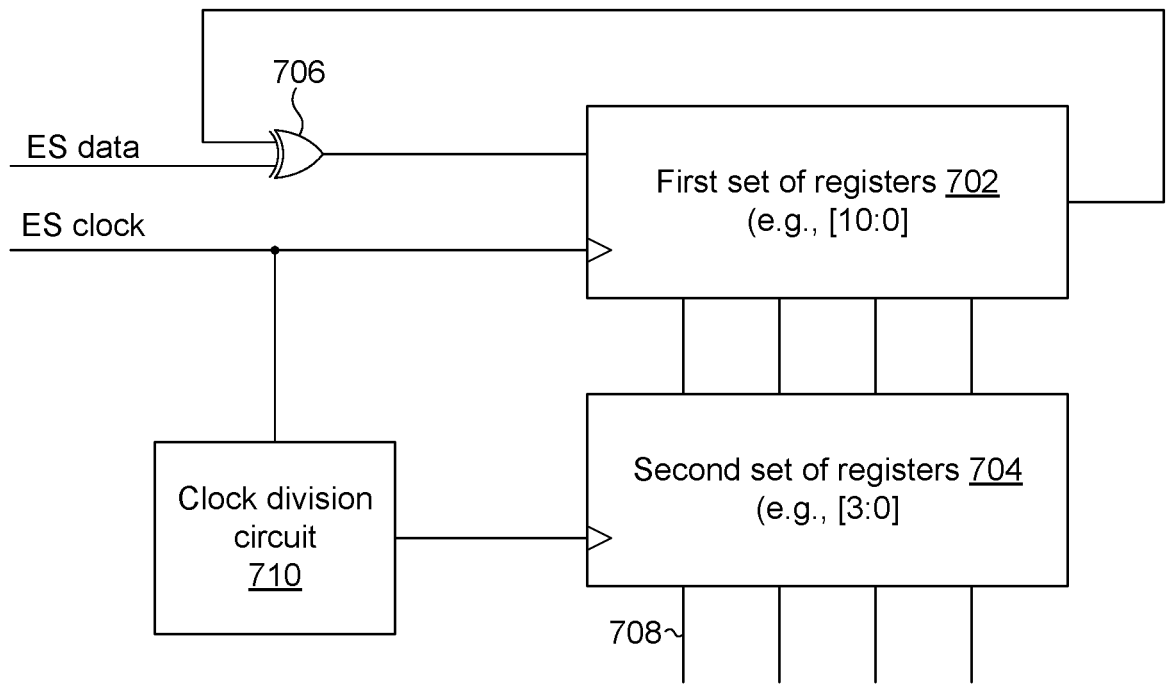
FIG. 7 shows a hybrid block-circuit diagram illustrating features of a serial decorrelator circuit according to an embodiment.

FIG. 7 illustrates a serial decorrelator circuit 700 in accordance with various embodiments. The serial decorrelator circuit 700 receives the output signal (ES Data) from the entropy source and processes it to generate a decorrelated output signal. The decorrelated output signal provides increased entropy compared with the output signal of the entropy source. For example, the serial decorrelator circuit 700 XORs the output signal from the entropy source with a prior version of the output signal, and/or reduces the number of bits in the decorrelated output signal compared with the output signal ES Data from the entropy source, to increase the entropy of the decorrelated output signal.

As shown in FIG. 7, the circuit 700 comprises a first set of registers 702 and a second set of registers 704. The circuit 700 further comprises an XOR gate 706. The XOR gate 706 receives as inputs the output signal ES Data from the entropy source and the output signal of the last register 702 of the first set of registers 702. In an embodiment, the output signal ES Data is further provided as feedback to promote a randomness of the entropy source (as variously described herein). The output of the XOR gate 706 is passed to the data input of the first register 702 of the first set of registers. Thus, the first set of registers 702 receives an XORed version of the output signal of the entropy source with a prior value of the output signal. The XOR function increases the entropy of the bits stored by the first set of registers 702.

In other embodiments, the XOR gate 706 is placed elsewhere in the signal path of the circuit 700. The XOR gate 706 is placed in a manner that results in recursion, or (in another embodiment) in a manner that does not. Additionally, or alternatively, in some embodiments, the circuit 700 is capable of selectively bypassing the XOR gate 706 to turn off the XOR function of the output signal.

In various embodiments, the first set of registers 702 stores a first number of bits of the data signal passed through the registers 702 (e.g., the XORed version of the output signal ES Data). The second set of registers 704 samples a second number of the bits stored by the first set of registers 702, where the second number is less than or equal to the first number. The bits stored by the second set of registers 704 are used as the decorrelated output signal of the circuit 700 (e.g., at output terminals 708).

In an embodiment, the first number of bits and second number of bits comprise any suitable values. In some embodiments, the first number is a prime number. In one non-limiting embodiment, the first number is 11 and/or the second number is 4.

The clock signal ES Clk used by the circuit 700 (e.g., received by the clock input of the registers 702) corresponds to the feedback signal generated by the deterministic feedback loop of the random number generator (e.g., the hclk-post signal described with reference to FIG. 4). The circuit 700 comprises a clock division circuit 710 to reduce the frequency of the clock signal ES Clk and to pass the reduced frequency clock signal to the clock inputs of the registers 704. Accordingly, during each cycle of the reduced frequency clock signal, the first set of registers 702 stores the first number of bits of the XORed output signal ES Data, and the second set of registers 704 samples the second number of the bits and output the sampled bits as the decorrelated output signal.

Referring again to FIG. 1, the serial decorrelator circuit 108 passes the decorrelated output signal to the serial-to-parallel converter 110. The serial-to-parallel converter 110 converts the serial bitstream(s) of the decorrelated output signal into a parallel bit string that corresponds to a random number generated by the circuit 100. For example, in one non-limiting example, the serial-to-parallel converter 110 receives the 4-bit wide signal from the second set of registers 704 and convert it to a 32-bit wide output bit string.

Figure 8:
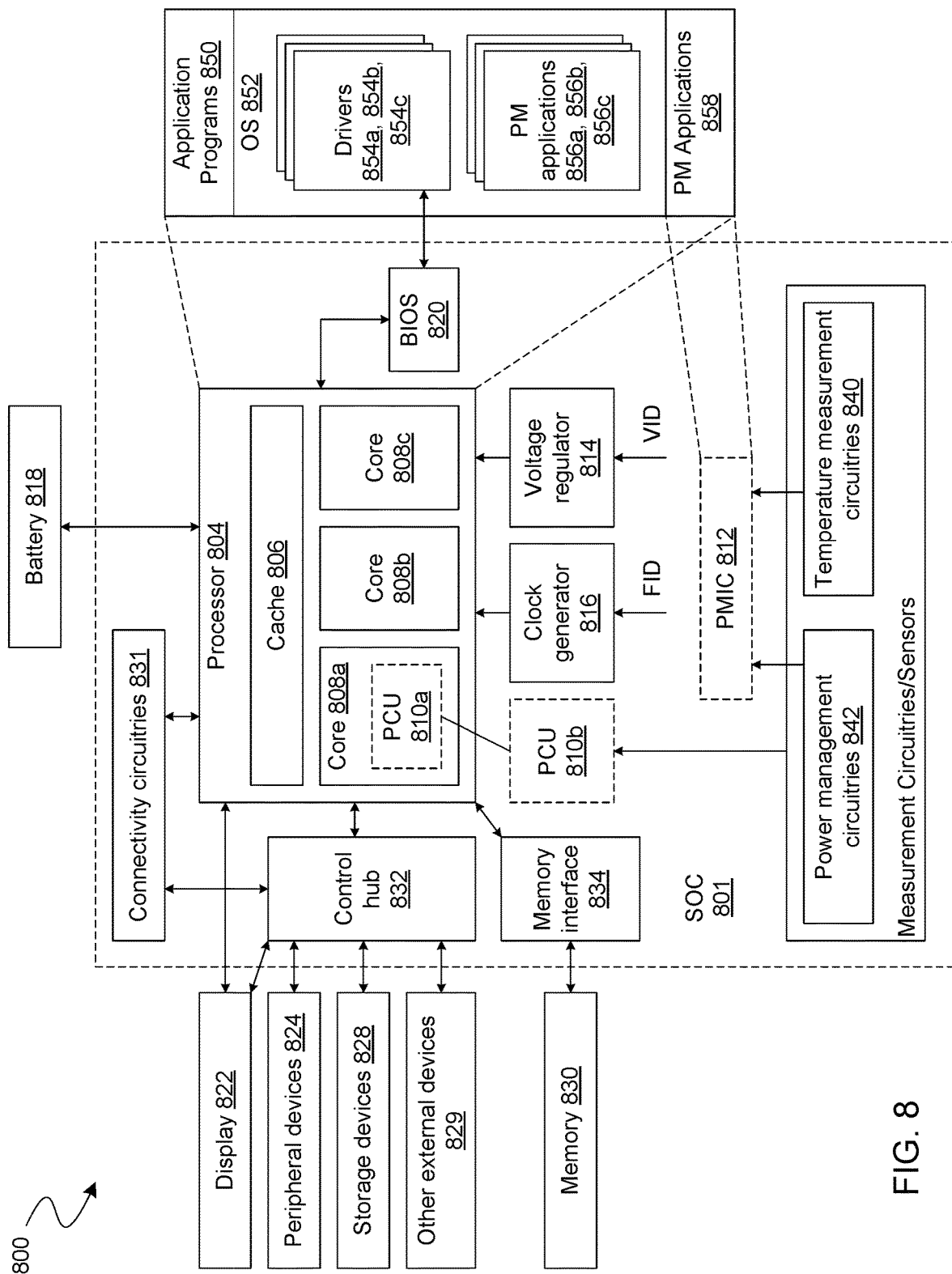
FIG. 8 illustrates an example system configured to employ the apparatuses and methods described herein, in accordance with various embodiments.

FIG. 8 illustrates a computer system or computing device 800 (also referred to as device 800), where circuitry provides random number generator functionality, in accordance with some embodiments. It is pointed out that those elements of FIG. 8 having the same reference numbers (or names) as the elements of any other figure can operate or function in any manner similar to that described, but are not limited to such.

In some embodiments, device 800 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 800.

In an example, the device 800 comprises a SoC (System-on-Chip) 801. An example boundary of the SOC 801 is illustrated using dotted lines in FIG. 8, with some example components being illustrated to be included within SOC 801—however, SOC 801 may include any appropriate components of device 800.

In some embodiments, device 800 includes processor 804. Processor 804 can include one or more physical devices, such as microprocessors, application processors, microcontrollers, programmable logic devices, processing cores, or other processing means. The processing operations performed by processor 804 include the execution of an operating platform or operating system on which applications and/or device functions are executed. The processing operations include operations related to I/O (input/output) with a human user or with other devices, operations related to power management, operations related to connecting computing device 800 to another device, and/or the like. The processing operations may also include operations related to audio I/O and/or display I/O.

In some embodiments, processor 804 includes multiple processing cores (also referred to as cores) 808*a*, 808*b*, 808*c*. Although merely three cores 808*a*, 808*b*, 808*c* are illustrated in FIG. 8, the processor 804 may include any other appropriate number of processing cores, e.g., tens, or even hundreds of processing cores. Processor cores 808*a*, 808*b*, 808*c* may be implemented on a single integrated circuit (IC) chip. Moreover, the chip may include one or more shared and/or private caches, buses or interconnections, graphics and/or memory controllers, or other components.

In some embodiments, processor 804 includes cache 806. In an example, sections of cache 806 may be dedicated to individual cores 808 (e.g., a first section of cache 806 dedicated to core 808*a*, a second section of cache 806 dedicated to core 808*b*, and so on). In an example, one or more sections of cache 806 may be shared among two or more of cores 808. Cache 806 may be split in different levels, e.g., level 1 (L1) cache, level 2 (L2) cache, level 3 (L3) cache, etc.

In some embodiments, a given processor core (e.g., core 808*a*) may include a fetch unit to fetch instructions (including instructions with conditional branches) for execution by the core 808*a*. The instructions may be fetched from any storage devices such as the memory 830. Processor core 808*a* may also include a decode unit to decode the fetched instruction. For example, the decode unit may decode the fetched instruction into a plurality of micro-operations. Processor core 808*a* may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 808*a* (for example) may be an out-of-order processor core in one embodiment. Processor core 808*a* may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 808*a* may also include a bus unit to enable communication between components of the processor core 808*a* and other components via one or more buses. Processor core 808*a* may also include one or more registers to store data accessed by various components of the core 808*a* (such as values related to assigned app priorities and/or sub-system states (modes) association.

In some embodiments, device 800 comprises connectivity circuitries 831. For example, connectivity circuitries 831 includes hardware devices (e.g., wireless and/or wired connectors and communication hardware) and/or software components (e.g., drivers, protocol stacks), e.g., to enable device 800 to communicate with external devices. Device 800 may be separate from the external devices, such as other computing devices, wireless access points or base stations, etc.

In an example, connectivity circuitries 831 may include multiple different types of connectivity. To generalize, the connectivity circuitries 831 may include cellular connectivity circuitries, wireless connectivity circuitries, etc. Cellular connectivity circuitries of connectivity circuitries 831 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 831 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 831 may include a network interface, such as a wired or wireless interface, e.g., so that a system embodiment may be incorporated into a wireless device, for example, cell phone or personal digital assistant.

In some embodiments, device 800 comprises control hub 832, which represents hardware devices and/or software components related to interaction with one or more I/O devices. For example, processor 804 may communicate with one or more of display 822, one or more peripheral devices 824, storage devices 828, one or more other external devices 829, etc., via control hub 832. Control hub 832 may be a chipset, a Platform Control Hub (PCH), and/or the like.

For example, control hub 832 illustrates one or more connection points for additional devices that connect to device 800, e.g., through which a user might interact with the system. For example, devices (e.g., devices 829) that can be attached to device 800 include microphone devices, speaker or stereo systems, audio devices, video systems or other display devices, keyboard or keypad devices, or other I/O devices for use with specific applications such as card readers or other devices.

As mentioned above, control hub 832 can interact with audio devices, display 822, etc. For example, input through a microphone or other audio device can provide input or commands for one or more applications or functions of device 800. Additionally, audio output can be provided instead of, or in addition to display output. In another example, if display 822 includes a touch screen, display 822 also acts as an input device, which can be at least partially managed by control hub 832. There can also be additional buttons or switches on computing device 800 to provide I/O functions managed by control hub 832. In one embodiment, control hub 832 manages devices such as accelerometers, cameras, light sensors or other environmental sensors, or other hardware that can be included in device 800. The input can be part of direct user interaction, as well as providing environmental input to the system to influence its operations (such as filtering for noise, adjusting displays for brightness detection, applying a flash for a camera, or other features).

In some embodiments, control hub 832 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 822 represents hardware (e.g., display devices) and software (e.g., drivers) components that provide a visual and/or tactile display for a user to interact with device 800. Display 822 may include a display interface, a display screen, and/or hardware device used to provide a display to a user. In some embodiments, display 822 includes a touch screen (or touch pad) device that provides both output and input to a user. In an example, display 822 may communicate directly with the processor 804. Display 822 can be one or more of an internal display device, as in a mobile electronic device or a laptop device or an external display device attached via a display interface (e.g., DisplayPort, etc.). In one embodiment display 822 can be a head mounted display (HMD) such as a stereoscopic display device for use in virtual reality (VR) applications or augmented reality (AR) applications.

In some embodiments and although not illustrated in the figure, in addition to (or instead of) processor 804, device 800 may include Graphics Processing Unit (GPU) comprising one or more graphics processing cores, which may control one or more aspects of displaying contents on display 822.

Control hub 832 (or platform controller hub) may include hardware interfaces and connectors, as well as software components (e.g., drivers, protocol stacks) to make peripheral connections, e.g., to peripheral devices 824.

It will be understood that device 800 could both be a peripheral device to other computing devices, as well as have peripheral devices connected to it. Device 800 may have a "docking" connector to connect to other computing devices for purposes such as managing (e.g., downloading and/or uploading, changing, synchronizing) content on device 800. Additionally, a docking connector can allow device 800 to connect to certain peripherals that allow computing device 800 to control content output, for example, to audiovisual or other systems.

In addition to a proprietary docking connector or other proprietary connection hardware, device 800 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 831 may be coupled to control hub 832, e.g., in addition to, or instead of, being coupled directly to the processor 804. In some embodiments, display 822 may be coupled to control hub 832, e.g., in addition to, or instead of, being coupled directly to processor 804.

In some embodiments, device 800 comprises memory 830 coupled to processor 804 via memory interface 834. Memory 830 includes memory devices for storing information in device 800. Memory can include nonvolatile (state does not change if power to the memory device is interrupted) and/or volatile (state is indeterminate if power to the memory device is interrupted) memory devices. Memory device 830 can be a dynamic random access memory (DRAM) device, a static random access memory (SRAM) device, flash memory device, phase-change memory device, or some other memory device having suitable performance to serve as process memory. In one embodiment, memory 830 can operate as system memory for device 800, to store data and instructions for use when the one or more processors 804 executes an application or process. Memory 830 can store application data, user data, music, photos, documents, or other data, as well as system data (whether long-term or temporary) related to the execution of the applications and functions of device 800.

Elements of various embodiments and examples are also provided as a machine-readable medium (e.g., memory 830) for storing the computer-executable instructions (e.g., instructions to implement any other processes discussed herein). The machine-readable medium (e.g., memory 830) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 800 comprises temperature measurement circuitries 840, e.g., for measuring temperature of various components of device 800. In an example, temperature measurement circuitries 840 may be embedded, or coupled or attached to various components, whose temperature are to be measured and monitored. For example, temperature measurement circuitries 840 may measure temperature of (or within) one or more of cores 808a, 808b, 808c, voltage regulator 814, memory 830, a mother-board of SOC 801, and/or any appropriate component of device 800.

In some embodiments, device 800 comprises power measurement circuitries 842, e.g., for measuring power consumed by one or more components of the device 800. In an example, in addition to, or instead of, measuring power, the power measurement circuitries 842 may measure voltage and/or current. In an example, the power measurement circuitries 842 may be embedded, or coupled or attached to various components, whose power, voltage, and/or current consumption are to be measured and monitored. For example, power measurement circuitries 842 may measure power, current and/or voltage supplied by one or more voltage regulators 814, power supplied to SOC 801, power supplied to device 800, power consumed by processor 804 (or any other component) of device 800, etc.

In some embodiments, device 800 comprises one or more voltage regulator circuitries, generally referred to as voltage regulator (VR) 814. VR 814 generates signals at appropriate voltage levels, which may be supplied to operate any appropriate components of the device 800. Merely as an example, VR 814 is illustrated to be supplying signals to processor 804 of device 800. In some embodiments, VR 814 receives one or more Voltage Identification (VID) signals, and generates the voltage signal at an appropriate level, based on the VID signals. Various type of VRs may be utilized for the VR 814. For example, VR 814 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 810*a/b* and/or PMIC 812. In some embodiments, each core has a network of distributed LDOs to provide efficient control for power management. The LDOs can be digital, analog, or a combination of digital or analog LDOs.

In some embodiments, device 800 comprises one or more clock generator circuitries, generally referred to as clock generator 816. Clock generator 816 generates clock signals at appropriate frequency levels, which may be supplied to any appropriate components of device 800. Merely as an example, clock generator 816 is illustrated to be supplying clock signals to processor 804 of device 800. In some embodiments, clock generator 816 receives one or more Frequency Identification (FID) signals, and generates the clock signals at an appropriate frequency, based on the FID signals.

In some embodiments, device 800 comprises battery 818 supplying power to various components of device 800. Merely as an example, battery 818 is illustrated to be supplying power to processor 804. Although not illustrated in the figures, device 800 may comprise a charging circuitry, e.g., to recharge the battery, based on Alternating Current (AC) power supply received from an AC adapter.

In some embodiments, device 800 comprises Power Control Unit (PCU) 810 (also referred to as Power Management Unit (PMU), Power Controller, etc.). In an example, some sections of PCU 810 may be implemented by one or more processing cores 808, and these sections of PCU 810 are symbolically illustrated using a dotted box and labelled PCU 810*a*. In an example, some other sections of PCU 810 may be implemented outside the processing cores 808, and these sections of PCU 810 are symbolically illustrated using a dotted box and labelled as PCU 810*b*. PCU 810 may implement various power management operations for device 800. PCU 810 may include hardware interfaces, hardware circuitries, connectors, registers, etc., as well as software components (e.g., drivers, protocol stacks), to implement various power management operations for device 800.

In some embodiments, device 800 comprises Power Management Integrated Circuit (PMIC) 812, e.g., to implement various power management operations for device 800. In some embodiments, PMIC 812 is a Reconfigurable Power Management ICs (RPMICs) and/or an IMVP (Intel® Mobile Voltage Positioning). In an example, the PMIC is within an IC chip separate from processor 804. The may implement various power management operations for device 800. PMIC 812 may include hardware interfaces, hardware circuitries, connectors, registers, etc., as well as software components (e.g., drivers, protocol stacks), to implement various power management operations for device 800.

In an example, device 800 comprises one or both PCU 810 or PMIC 812. In an example, any one of PCU 810 or PMIC 812 may be absent in device 800, and hence, these components are illustrated using dotted lines.

Various power management operations of device 800 may be performed by PCU 810, by PMIC 812, or by a combination of PCU 810 and PMIC 812. For example, PCU 810 and/or PMIC 812 may select a power state (e.g., P-state) for various components of device 800. For example, PCU 810 and/or PMIC 812 may select a power state (e.g., in accordance with the ACPI (Advanced Configuration and Power Interface) specification) for various components of device 800. Merely as an example, PCU 810 and/or PMIC 812 may cause various components of the device 800 to transition to a sleep state, to an active state, to an appropriate C state (e.g., C0 state, or another appropriate C state, in accordance with the ACPI specification), etc. In an example, PCU 810 and/or PMIC 812 may control a voltage output by VR 814 and/or a frequency of a clock signal output by the clock generator, e.g., by outputting the VID signal and/or the FID signal, respectively. In an example, PCU 810 and/or PMIC 812 may control battery power usage, charging of battery 818, and features related to power saving operation.

The clock generator 816 can comprise a phase locked loop (PLL), frequency locked loop (FLL), or any suitable clock source. In some embodiments, each core of processor 804 has its own clock source. As such, each core can operate at a frequency independent of the frequency of operation of the other core. In some embodiments, PCU 810 and/or PMIC 812 performs adaptive or dynamic frequency scaling or adjustment. For example, clock frequency of a processor core can be increased if the core is not operating at its maximum power consumption threshold or limit. In some embodiments, PCU 810 and/or PMIC 812 determines the operating condition of each core of a processor, and opportunistically adjusts frequency and/or power supply voltage of that core without the core clocking source (e.g., PLL of that core) losing lock when the PCU 810 and/or PMIC 812 determines that the core is operating below a target performance level. For example, if a core is drawing current from a power supply rail less than a total current allocated for that core or processor 804, then PCU 810 and/or PMIC 812 can temporarily increase the power draw for that core or processor 804 (e.g., by increasing clock frequency and/or power supply voltage level) so that the core or processor 804 can perform at a higher performance level. As such, voltage and/or frequency can be increased temporality for processor 804 without violating product reliability.

In an example, PCU 810 and/or PMIC 812 may perform power management operations, e.g., based at least in part on receiving measurements from power measurement circuitries 842, temperature measurement circuitries 840, charge level of battery 818, and/or any other appropriate information that may be used for power management. To that end, PMIC 812 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 810 and/or PMIC 812 in at least one embodiment to allow PCU 810 and/or PMIC 812 to manage processor core energy at least in part based on value(s) detected by one or more of the sensors.

Also illustrated is an example software stack of device 800 (although not all elements of the software stack are illustrated). Merely as an example, processors 804 may execute application programs 850, Operating System 852, one or more Power Management (PM) specific application programs (e.g., generically referred to as PM applications 858), and/or the like. PM applications 858 may also be executed by the PCU 810 and/or PMIC 812. OS 852 may also include one or more PM applications 856*a*, 856*b*, 856*c*. The OS 852 may also include various drivers 854*a*, 854*b*, 854*c*, etc., some of which may be specific for power management purposes. In some embodiments, device 800 may further comprise a Basic Input/Output System (BIOS) 820. BIOS 820 may communicate with OS 852 (e.g., via one or more drivers 854), communicate with processors 804, etc.

For example, one or more of PM applications 858, 856, drivers 854, BIOS 820, etc. may be used to implement power management specific tasks, e.g., to control voltage and/or frequency of various components of device 800, to control wake-up state, sleep state, and/or any other appropriate power state of various components of device 800, control battery power usage, charging of the battery 818, features related to power saving operation, etc.

In various embodiments, circuit 100, circuit 200, circuit 300, circuit 400, circuit 500, or circuit 700 is used to generate a random number. The random number may be used, for example, for encryption (e.g., to encrypt data stored by the device 800, such as by memory 830, by one of peripheral devices 824, storage devices 828, or other external devices 829, or the like. Additionally, or alternatively, the random number may be used for authentication (e.g., to authenticate the computing device 800 with another device and/or to authenticate a component of the computing device 800 with another component of the computing device 800). For example, the computing device 800 may receive one or more challenges from another device, and may generate respective one or more responses based on the one or more challenges.

Techniques and architectures for providing a randomly generated value are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

In one or more first embodiments, a device comprises an entropy source comprising a first complementary metal-oxide-semiconductor (CMOS) inverter comprising a first input terminal, and a first output terminal, a second CMOS inverter comprising a second input terminal coupled to the first output terminal at a first node, and a second output terminal coupled to the first input terminal at a second node, wherein the entropy source is to generate a first signal at the first node, and a third CMOS inverter comprising a third input terminal to receive a first voltage, and a third output terminal which is coupled at the first node, and first circuitry coupled to the entropy source, the first circuitry to generate the first voltage based on a first value of the first signal, wherein, based on the first voltage, the entropy source is to generate a second value of the first signal.

In one or more second embodiments, further to the first embodiment, the entropy source further comprises a fourth CMOS inverter comprising a fourth input terminal to receive a second voltage, and a fourth output terminal which is coupled at the second node, wherein the entropy source is further to generate a second signal at the second node, the first circuitry is further to generate the second voltage based on a third value of the second signal, and based on the second voltage, the entropy source is to generate a fourth value of the second signal.

In one or more third embodiments, further to the first embodiment or the second embodiment, the entropy source further comprises a fourth CMOS inverter comprising a fourth input terminal to receive the first voltage, and a fourth output terminal which is coupled at the second node.

In one or more fourth embodiments, further to any of the first through third embodiments, the first CMOS inverter, the second CMOS inverter, and the third CMOS inverter each comprise a respective first transistor which is coupled at a third node, and the first CMOS inverter, the second CMOS inverter, and the third CMOS inverter are each to draw power via the third node.

In one or more fifth embodiments, further to the fourth embodiment, the entropy source further comprises a fourth CMOS inverter comprising a fourth input terminal to receive a second voltage, and a fourth output terminal which is coupled at the first node, wherein the fourth CMOS inverter comprises a respective first transistor which is coupled at the third node, and the fourth CMOS inverter is to draw power via the third node.

In one or more sixth embodiments, further to any of the first through fourth embodiments, the first circuitry comprises a first switch circuit coupled at a third node, a second switch circuit coupled at the third node, and a first capacitor coupled to the second switch circuit via a fourth node, wherein the first circuitry is to provide the first voltage at the fourth node.

In one or more seventh embodiments, further to the sixth embodiment, the third node comprises a conductor which extends to the first switch circuit and to the second switch circuit, and for any passive capacitor component of the first circuitry, the conductor is only indirectly coupled to a terminal of the passive capacitor component via a respective one of the first switch circuit or the second switch circuit.

In one or more eighth embodiments, further to the sixth embodiment, the entropy source further comprises a fourth CMOS inverter comprising a fourth input terminal to receive a second voltage, and a fourth output terminal which is coupled at the first node, wherein the entropy source is further to generate a second signal at the second node, wherein the first circuitry is further to generate the second voltage based on a third value of the second signal, and wherein the first circuitry further comprises a third switch circuit coupled at a fifth node, a fourth switch circuit coupled at the fifth node, and a second capacitor coupled to the fourth switch circuit via a sixth node, wherein the first circuitry is to provide the second voltage at the sixth node, and wherein, based on the second voltage, the entropy source is to generate a fourth value of the second signal.

In one or more ninth embodiments, further to the sixth embodiment, the capacitor is coupled between the fourth node and a fifth node which is to provide a reference potential, any circuit path which extends to both the third node and the fifth node comprises a respective one of the first switch circuit or the second switch circuit, and the first circuitry is to output the first signal via the fourth node.

In one or more tenth embodiments, further to any of the first through fourth embodiments, the first circuitry comprises a dynamic element matching circuit to generate the first voltage based on the first value of the first signal.

In one or more eleventh embodiments, a device comprises an entropy source comprising cross-coupled complementary metal-oxide-semiconductor (CMOS) inverters, the entropy source to generate a first signal at a first node, and first circuitry coupled to the entropy source, the first circuitry to generate a first voltage based on a first value of the first signal, wherein, based on the first voltage, the entropy source is to generate a second value of the first signal, wherein the first circuitry comprises a first switch circuit coupled at a second node, a second switch circuit coupled at the second node, and a first capacitor coupled to the second switch circuit via a third node, wherein the first circuitry is to provide the first voltage at the third node, wherein the second node comprises a conductor which extends to the first switch circuit and to the second switch circuit, and wherein for any passive capacitor component of the first circuitry, the conductor is only indirectly coupled to a terminal of the passive capacitor component via a respective one of the first switch circuit or the second switch circuit.

In one or more twelfth embodiments, further to the eleventh embodiment, the first circuitry further comprises a third switch circuit coupled at a fourth node, a fourth switch circuit coupled at the fourth node, and a second capacitor coupled to the fourth switch circuit via a fifth node, wherein the first circuitry is to provide a second voltage at the fifth node, wherein the entropy source is to generate a second value of the first signal further based on the second voltage, wherein the fourth node comprises a second conductor which extends to the third switch circuit and to the fourth switch circuit, and wherein for any passive capacitor component of the first circuitry, the second conductor is only indirectly coupled to a terminal of the passive capacitor component via a respective one of the third switch circuit or the fourth switch circuit.

In one or more thirteenth embodiments, further to the eleventh embodiment or the twelfth embodiment, the first circuitry comprises a dynamic element matching circuit to generate the first voltage based on the first value of the first signal.

In one or more fourteenth embodiments, further to any of the eleventh through thirteenth embodiments, the cross-coupled CMOS inverters comprise a first CMOS inverter comprising a first input terminal, and a first output terminal, and a second CMOS inverter comprising a second input terminal coupled to the first output terminal at a fourth node, and a second output terminal coupled to the first input terminal at a fifth node, and wherein the entropy source further comprises a third CMOS inverter comprising a third input terminal to receive the first voltage, and a third output terminal which is coupled at the fourth node.

In one or more fifteenth embodiments, a system comprises a random number generator circuit comprising an entropy source comprising a first complementary metal-oxide-semiconductor (CMOS) inverter comprising a first input terminal, and a first output terminal, a second CMOS inverter comprising a second input terminal coupled to the first output terminal at a first node, and a second output terminal coupled to the first input terminal at a second node, wherein the entropy source is to generate a first signal at the first node, and a third CMOS inverter comprising a third input terminal to receive a first voltage, and a third output terminal which is coupled at the first node, and first circuitry coupled to the entropy source, the first circuitry to generate the first voltage based on a first value of the first signal, wherein, based on the first voltage, the entropy source is to generate a second value of the first signal. The system further comprises a display device coupled to the random number generator circuit, the display device to display an image based on the first signal.

In one or more sixteenth embodiments, further to the fifteenth embodiment, the entropy source further comprises a fourth CMOS inverter comprising a fourth input terminal to receive a second voltage, and a fourth output terminal which is coupled at the second node, wherein the entropy source is further to generate a second signal at the second node, the first circuitry is further to generate the second voltage based on a third value of the second signal, and based on the second voltage, the entropy source is to generate a fourth value of the second signal.

In one or more seventeenth embodiments, further to the fifteenth embodiment or the sixteenth embodiment, the entropy source further comprises a fourth CMOS inverter comprising a fourth input terminal to receive the first voltage, and a fourth output terminal which is coupled at the second node.

In one or more eighteenth embodiments, further to any of the fifteenth through seventeenth embodiments, the first CMOS inverter, the second CMOS inverter, and the third CMOS inverter each comprise a respective first transistor which is coupled at a third node, and the first CMOS inverter, the second CMOS inverter, and the third CMOS inverter are each to draw power via the third node.

In one or more nineteenth embodiments, further to the eighteenth embodiment, the entropy source further comprises a fourth CMOS inverter comprising a fourth input terminal to receive a second voltage, and a fourth output terminal which is coupled at the first node, wherein the fourth CMOS inverter comprises a respective first transistor which is coupled at the third node, and the fourth CMOS inverter is to draw power via the third node.

In one or more twentieth embodiments, further to any of the fifteenth through eighteenth embodiments, the first circuitry comprises a first switch circuit coupled at a third node, a second switch circuit coupled at the third node, and a first capacitor coupled to the second switch circuit via a fourth node, wherein the first circuitry is to provide the first voltage at the fourth node.

In one or more twenty-first embodiments, further to the twentieth embodiment, the third node comprises a conductor which extends to the first switch circuit and to the second switch circuit, and for any passive capacitor component of the first circuitry, the conductor is only indirectly coupled to a terminal of the passive capacitor component via a respective one of the first switch circuit or the second switch circuit.

In one or more twenty-second embodiments, further to the twentieth embodiment, the entropy source further comprises a fourth CMOS inverter comprises a fourth input terminal to receive a second voltage, and a fourth output terminal which is coupled at the first node, wherein the entropy source is further to generate a second signal at the second node, wherein the first circuitry is further to generate the second voltage based on a third value of the second signal, and wherein the first circuitry further comprises a third switch circuit coupled at a fifth node, a fourth switch circuit coupled at the fifth node, and a second capacitor coupled to the fourth switch circuit via a sixth node, wherein the first circuitry is to provide the second voltage at the sixth node, and wherein, based on the second voltage, the entropy source is to generate a fourth value of the second signal.

In one or more twenty-third embodiments, further to the twentieth embodiment, the capacitor is coupled between the fourth node and a fifth node which is to provide a reference potential, any circuit path which extends to both the third node and the fifth node comprises a respective one of the first switch circuit or the second switch circuit, and the first circuitry is to output the first signal via the fourth node.

In one or more twenty-fourth embodiments, further to any of the fifteenth through eighteenth embodiments, the first circuitry comprises a dynamic element matching circuit to generate the first voltage based on the first value of the first signal.

What is claimed is:

1. A device comprising:
   an entropy source comprising:
      a first complementary metal-oxide-semiconductor (CMOS) inverter comprising a first input terminal, and a first output terminal;
      a second CMOS inverter comprising a second input terminal coupled to the first output terminal at a first node, and a second output terminal coupled to the first input terminal at a second node, wherein the entropy source is to generate a first signal at the first node; and
      a third CMOS inverter comprising a third input terminal to receive a first voltage, and a third output terminal which is coupled at the first node; and
   first circuitry coupled to the entropy source, the first circuitry to generate the first voltage based on a first value of the first signal;
   wherein, based on the first voltage, the entropy source is to generate a second value of the first signal.

2. The device of claim 1, the entropy source further comprising a fourth CMOS inverter comprising a fourth input terminal to receive a second voltage, and a fourth output terminal which is coupled at the second node;
   wherein:
      the entropy source is further to generate a second signal at the second node;
      the first circuitry is further to generate the second voltage based on a third value of the second signal; and
      based on the second voltage, the entropy source is to generate a fourth value of the second signal.

3. The device of claim 1, the entropy source further comprising a fourth CMOS inverter comprising a fourth input terminal to receive the first voltage, and a fourth output terminal which is coupled at the second node.

4. The device of claim 1, wherein:
   the first CMOS inverter, the second CMOS inverter, and the third CMOS inverter each comprise a respective first transistor which is coupled at a third node; and the first CMOS inverter, the second CMOS inverter, and
the third CMOS inverter are each to draw power via the
third node.

5. The device of claim 4, the entropy source further comprising:
a fourth CMOS inverter comprising a fourth input terminal to receive a second voltage, and a fourth output terminal which is coupled at the first node;
wherein:
the fourth CMOS inverter comprises a respective first transistor which is coupled at the third node; and
the fourth CMOS inverter is to draw power via the third node.

6. The device of claim 1, wherein the first circuitry comprises:
a first switch circuit coupled at a third node;
a second switch circuit coupled at the third node; and
a first capacitor coupled to the second switch circuit via a fourth node, wherein the first circuitry is to provide the first voltage at the fourth node.

7. The device of claim 6, wherein:
the third node comprises a conductor which extends to the first switch circuit and to the second switch circuit; and
for any passive capacitor component of the first circuitry, the conductor is only indirectly coupled to a terminal of the passive capacitor component via a respective one of the first switch circuit or the second switch circuit.

8. The device of claim 6, wherein the entropy source further comprises a fourth CMOS inverter comprising a fourth input terminal to receive a second voltage, and a fourth output terminal which is coupled at the first node;
wherein the entropy source is further to generate a second signal at the second node;
wherein the first circuitry is further to generate the second voltage based on a third value of the second signal; and
wherein the first circuitry further comprises:
a third switch circuit coupled at a fifth node;
a fourth switch circuit coupled at the fifth node; and
a second capacitor coupled to the fourth switch circuit via a sixth node, wherein the first circuitry is to provide the second voltage at the sixth node; and
wherein, based on the second voltage, the entropy source is to generate a fourth value of the second signal.

9. The device of claim 6, wherein:
the first capacitor is coupled between the fourth node and a fifth node which is to provide a reference potential;
any circuit path which extends to both the third node and the fifth node comprises a respective one of the first switch circuit or the second switch circuit; and
the first circuitry is to output the first signal via the fourth node.

10. The device of claim 1, wherein the first circuitry comprises a dynamic element matching circuit to generate the first voltage based on the first value of the first signal.

11. A device comprising:
an entropy source comprising cross-coupled complementary metal-oxide-semiconductor (CMOS) inverters, the entropy source to generate a first signal at a first node; and
first circuitry coupled to the entropy source, the first circuitry to generate a first voltage based on a first value of the first signal, wherein, based on the first voltage, the entropy source is to generate a second value of the first signal;
wherein the first circuitry comprises a first switch circuit coupled at a second node, a second switch circuit coupled at the second node, and a first capacitor coupled to the second switch circuit via a third node;
wherein the first circuitry is to provide the first voltage at the third node;
wherein the second node comprises a conductor which extends to the first switch circuit and to the second switch circuit; and
wherein for any passive capacitor component of the first circuitry, the conductor is only indirectly coupled to a terminal of the passive capacitor component via a respective one of the first switch circuit or the second switch circuit.

12. The device of claim 11, wherein the first circuitry further comprises a third switch circuit coupled at a fourth node, a fourth switch circuit coupled at the fourth node, and a second capacitor coupled to the fourth switch circuit via a fifth node;
wherein the first circuitry is to provide a second voltage at the fifth node;
wherein the entropy source is to generate the second value of the first signal further based on the second voltage;
wherein the fourth node comprises a second conductor which extends to the third switch circuit and to the fourth switch circuit; and
wherein for any passive capacitor component of the first circuitry, the second conductor is only indirectly coupled to a terminal of the passive capacitor component via a respective one of the third switch circuit or the fourth switch circuit.

13. The device of claim 11, wherein the first circuitry comprises a dynamic element matching circuit to generate the first voltage based on the first value of the first signal.

14. The device of claim 11, wherein the cross-coupled CMOS inverters comprise:
a first CMOS inverter comprising a first input terminal, and a first output terminal; and
a second CMOS inverter comprising a second input terminal coupled to the first output terminal at a fourth node, and a second output terminal coupled to the first input terminal at a fifth node; and
wherein the entropy source further comprises a third CMOS inverter comprising a third input terminal to receive the first voltage, and a third output terminal which is coupled at the fourth node.

15. A system comprising:
a random number generator circuit comprising:
an entropy source comprising:
a first complementary metal-oxide-semiconductor (CMOS) inverter comprising a first input terminal, and a first output terminal;
a second CMOS inverter comprising a second input terminal coupled to the first output terminal at a first node, and a second output terminal coupled to the first input terminal at a second node, wherein the entropy source is to generate a first signal at the first node; and
a third CMOS inverter comprising a third input terminal to receive a first voltage, and a third output terminal which is coupled at the first node; and
first circuitry coupled to the entropy source, the first circuitry to generate the first voltage based on a first value of the first signal;
wherein, based on the first voltage, the entropy source is to generate a second value of the first signal; and
a display device coupled to the random number generator circuit, the display device to display an image based on the first signal.

16. The system of claim 15, the entropy source further comprising a fourth CMOS inverter comprising a fourth input terminal to receive a second voltage, and a fourth output terminal which is coupled at the second node;
wherein:
the entropy source is further to generate a second signal at the second node;
the first circuitry is further to generate the second voltage based on a third value of the second signal; and
based on the second voltage, the entropy source is to generate a fourth value of the second signal.

17. The system of claim 15, the entropy source further comprising a fourth CMOS inverter comprising a fourth input terminal to receive the first voltage, and a fourth output terminal which is coupled at the second node.

18. The system of claim 15, wherein:
the first CMOS inverter, the second CMOS inverter, and the third CMOS inverter each comprise a respective first transistor which is coupled at a third node; and
the first CMOS inverter, the second CMOS inverter, and the third CMOS inverter are each to draw power via the third node.

19. The system of claim 18, the entropy source further comprising:
a fourth CMOS inverter comprising a fourth input terminal to receive a second voltage, and a fourth output terminal which is coupled at the first node;
wherein:
the fourth CMOS inverter comprises a respective first transistor which is coupled at the third node; and
the fourth CMOS inverter is to draw power via the third node.

20. The system of claim 15, wherein the first circuitry comprises:
a first switch circuit coupled at a third node;
a second switch circuit coupled at the third node; and
a first capacitor coupled to the second switch circuit via a fourth node, wherein the first circuitry is to provide the first voltage at the fourth node.

* * * * *